United States Patent
Nagaya et al.

(10) Patent No.: US 6,935,814 B2
(45) Date of Patent: Aug. 30, 2005

(54) THROWAWAY INSERT AND THROWAWAY CUTTING TOOL

(75) Inventors: Hidehiko Nagaya, Yuuki-gun (JP); Koichi Ikenaga, Moriya (JP); Hiroaki Hayashizaki, Tsukuba (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 10/784,039

(22) Filed: Feb. 20, 2004

(65) Prior Publication Data

US 2004/0165961 A1 Aug. 26, 2004

Related U.S. Application Data

(63) Continuation of application No. 10/388,348, filed on Mar. 13, 2003, now Pat. No. 6,733,212.

(30) Foreign Application Priority Data

Mar. 20, 2002 (JP) ........................................ 2002-079286

(51) Int. Cl.[7] .............................................. B26D 1/00
(52) U.S. Cl. ...................... 407/100; 407/113; 407/116
(58) Field of Search ................................ 407/100, 113, 407/116, 101, 102

(56) References Cited

U.S. PATENT DOCUMENTS 5,791,832 A 8/1998 Yamayose
5,921,721 A * 7/1999 Hintze et al. ................ 407/113
6,158,927 A * 12/2000 Cole et al. ..................... 407/48
6,213,691 B1 4/2001 Leeb

FOREIGN PATENT DOCUMENTS

| DE | 44 34 297 A1 | 3/1996 |
| DE | 100 52 963 A1 | 5/2002 |
| EP | 1 122 010 A1 | 8/2001 |
| JP | 2000-141123 A1 | 5/2000 |

* cited by examiner

*Primary Examiner*—Willmon Fridie, Jr.
(74) *Attorney, Agent, or Firm*—Darby & Darby

(57) ABSTRACT

A throwaway insert comprises an insert body formed in a polygonal shape, a cutting face formed by a polygonal face of the insert body, a corner cutting edge which is formed in a curved shape at a corner of the cutting face, a major cutting edge which is formed along a side edge of the cutting face that is connected to a first end of the corner cutting edge, and a concave portion which is formed, in another side edge of the cutting face that is connected to a second end of the corner cutting edge, so as to be adjacent to the second end of the corner cutting edge, and so as to be made concave toward the inside of the cutting face from a tangent of the corner cutting edge drawn at the second end of the corner cutting edge. By using the throwaway insert, cut chips are prevented from being packed in a gap between the throwaway insert and a surface being machined, and the fixing rigidity of the throwaway insert is increased.

10 Claims, 16 Drawing Sheets

THROWAWAY INSERT AND THROWAWAY CUTTING TOOL

CROSS-REFERENCE TO RELATED APPLICATION

This patent application claims the benefit of priority, under 35 U.S.C. §119 to Japanese Patent Application No. 2002-079286 filed on Mar. 20, 2002 and under 35 U.S.C. §120, as a continuation application of U.S. patent application Ser. No. 10/388,348, filed Mar. 13, 2003, now U.S. Pat. No. 6,733,212 entitled "THROWAWAY INSERT AND THROWAWAY CUTTING TOOL", hereby incorporated herein by references, in their entirety.

BACKGROUND OF THE INVENTION

1. Field of the Invention

The present invention relates to a throwaway insert which is detachably attached to a throwaway cutting tool (hereinafter referred to as a cutting tool), and the present invention also relates to a cutting tool provided with such a throwaway insert.

2. Background Art

As examples of such a throwaway insert and cutting tool, the inventors of the present invention have proposed a throwaway insert and a rotating cutting tool in Japanese Unexamined Patent Application, First Publication No. 2000-141123. In this case, the throwaway insert comprises a first cutting edge (a major cutting edge) having a predetermined length, and a second cutting edge (a corner cutting edge) which extends radially and outwardly from the first cutting edge as viewed from an axis of rotation, and which has a relatively small radius of curvature, and the throwaway insert is adapted to be detachably attached to a cutting tool main body (rotating cutting tool) in such a manner that the throwaway insert projects from the outer periphery of the cutting tool main body while a predetermined cutting angle is applied to the first cutting edge when being attached to the cutting tool main body. The rotating cutting tool enables continuous formation, in a workpiece to be machined, of a plane portion and a wall connected to the plane portion with a predetermined angle by rotating about the axis of rotation with the above-mentioned throwaway insert while translating the axis of rotation. According to such a throwaway insert and a cutting tool, if compared with a cutting tool provided with a circular disc-shaped throwaway insert, it is possible to improve efficiency of cutting because the contact length between the cutting tool and the workpiece, and therefore, cutting resistance depending on the contact length are not significantly changed between the case in which the plane portion is machined and the case in which the wall is machined, and because the rotating speed of the cutting tool when the plane portion is machined need not be set as low as when the wall is machined.

In such conventional throwaway insert and cutting tool, a side edge, which is connected to the second cutting edge, and which is directed radially and outwardly with respect to the cutting tool, is formed so as to incline radially and inwardly with respect to the axis of rotation in order to avoid interference with the wall to be machined, and as a result, there is formed a gap between an end of the side edge and the outermost point of the throwaway insert, which defines the maximum radius of rotation. In the above-mentioned throwaway insert, because the side edge, which is connected to the second cutting edge, is formed in a straight shape, and because the gap between the side edge and the wall gradually decreases as the distance from the second cutting edge decreases even though the side edge is inclined radially and inwardly, cut chips tend to be packed up in the narrow gap when, in particular, cutting is performed while the axis of rotation is directed in the horizontal direction, and as a result, the machined surface (the wall) may be damaged, or the throwaway insert may be chipped off. Moreover, the above-mentioned throwaway insert is substantially formed in a polygonal plate shape, and the throwaway insert is attached to the cutting tool main body in such a manner that a pair of side edges, which include therebetween a corner that diagonally faces to the second cutting edge, are engaged with support surfaces of the cutting tool main body. Because the engagement is achieved by abutting flat surfaces, it is difficult to ensure sufficient rigidity in fixation of the throwaway insert against changes in the direction of cutting load applied to the throwaway insert between when the plane portion is machined and when the wall is machined, and as a result, the throwaway insert may be undesirably shifted.

SUMMARY OF THE INVENTION

Based on the above circumstances, an object of the present invention is provide a throwaway insert which enables reliably preventing cut chips from being packed up by ensuring clearance between the throwaway insert and a machined surface, and which enables a stable cutting operation by ensuring fixing rigidity in a state in which the throwaway insert is attached to a cutting tool main body. Another object of the present invention is to provide a cutting tool having such a throwaway insert.

In order to achieve the above objects, the present invention provides a throwaway insert comprising: an insert body formed in a polygonal shape; a cutting face formed by a polygonal face of the insert body; a corner cutting edge which is formed in a curved shape at a corner of the cutting face; a major cutting edge which is formed along a side edge of the cutting face that is connected to a first end of the corner cutting edge; and a concave portion which is formed, in another side edge of the cutting face that is connected to the other end of the corner cutting edge, so as to be adjacent to the other end of the corner cutting edge, and so as to be made concave toward the inside of the cutting face from a tangent of the corner cutting edge drawn at the other end of the corner cutting edge.

The present invention further provides a throwaway cutting tool comprising: a cutting tool main body which is rotatable about an axis of rotation and which has a distal end and a proximal end; and a throwaway insert, as a positive throwaway insert, of the present invention, wherein the throwaway insert is detachably attached to an outer periphery of the distal end of the cutting tool main body in such a manner that the cutting face thereof is directed in the direction of rotation of the cutting tool main body, that the corner cutting edge thereof is disposed at the distal end of the cutting tool main body while being projected radially and outwardly from the distal end, that the major cutting edge connected to a first end of the corner cutting edge is projected distally in the axial direction of the cutting tool main body while being inclined so as to depart from the distal end as the distance from the end of the corner cutting edge increases, and the distance from the center of the cutting tool main body decreases, and that a tangent drawn at the other end of the corner cutting edge is inclined toward the inside of the cutting tool main body as the distance from the proximal end of the cutting tool main body decreases.

In the above throwaway insert, a concave portion, which is shaped so as to be made concave from a tangent drawn at the second end of the corner cutting edge, is provided in the side edge that is connected to the second end of the corner cutting edge which is disposed so as to project radially and outwardly from the distal end of the cutting tool main body as viewed in a state in which the throwaway insert is attached to the cutting tool main body, and thus a larger gap between the surface (the wall) being machined and the throwaway insert can be ensured by the size of the concave portion which is made concave toward the inside of the cutting face when compared with the cases of conventional throwaway inserts and cutting tools. Moreover, another corner cutting edge may be provided at a portion of the cutting face diagonally opposing the above-mentioned corner cutting edge along with another concave portion adjacent to another corner cutting edge as in a conventional throwaway insert, or alternatively, the insert body may be formed as an equilateral polygon, and concave portions and adjacent concave portions may be provided corresponding to all corners of the polygon, respectively. As a result, another concave portion is formed in another side edge of the cutting face, and fixing rigidity of the insert may be increased to prevent shifting of the insert during a cutting operation if a convex portion, which is engageable with a recess in the insert body that is connected to another concave portion, is formed on the cutting tool main body.

In order to further ensure a large gap between the throwaway insert and the surface being machined, the concave portion may preferably be formed so as to be connected to the second end of the corner cutting edge, i.e., the concave portion preferably starts concaving toward the inside of the cutting face right at the second end of the corner cutting edge. In addition, if the bottom of the concave portion is formed as a straight line, the bottom surface of the recess connected to the concave portion is formed as a plane, and as a result, fixing rigidity of the insert may be further increased if a convex portion, which is engageable with a recess in the insert body that is connected to another concave portion, is formed on the cutting tool main body. On the other hand, if the bottom of the concave portion is formed as a curved concave line, a larger gap between the throwaway insert and the surface being machined may be ensured.

In the above throwaway insert, the major cutting edge may preferably be formed along a tangent of the corner cutting edge drawn at the second end of the corner cutting edge, or alternatively, the major cutting edge may preferably be formed by folded lines consisting of a tangent of the corner cutting edge drawn at the second end of the corner cutting edge and another line intersecting the tangent at a point opposite to the corner cutting edge at an obtuse angle. As a result, when the throwaway insert is attached to the cutting tool main body in such a manner that the major cutting edge is projected distally in the axial direction of the cutting tool main body so as to have a predetermined cutting edge angle while being inclined so as to depart from the distal end as the distance from the first end of the corner cutting edge increases, and the distance from the center of the cutting tool main body decreases as described above, the contact length between the major cutting edge and a workpiece being machined may be reduced, and thus the variation in cutting resistance can be restrained if compared with the case in which the entire major cutting edge is formed as an arc. In addition, if another concave portion, which is adjacent to another corner cutting edge, is further provided in a side edge opposing the corner cutting edge projecting radially and outwardly from the distal end of the cutting tool main body as described above, the flank, i.e., the side surface of the insert body, of another major cutting edge connected to an end of another corner cutting edge may be formed as a plane, and as a result, the support surface of the cutting tool main body can be reliably abutted against the flat flank, and the fixing rigidity of the throwaway insert may be further increased. In particular, if the major cutting edge is formed as two folded lines, an effect can be obtained that the cut chips made by the respective straight cutting edges are separated with respect to each other. In addition, because the cutting edge angle of a first straight portion of the major cutting edge, which is disposed, in an attached state, toward the proximal end of the cutting tool main body and outwardly with respect to the other (a second) straight portion while extending along the tangent drawn at the first end of the corner cutting edge, is greater than the cutting edge angle of the second straight portion of the major cutting edge, which is disposed inwardly with respect to the first straight portion, cutting is performed by the second straight portion when the depth of cut is relatively small, and on the other hand, when depth of cut is large, e.g., when a vertically extending wall is machined, the first straight portion also contributes to cutting, and as a result, an increase in cutting resistance may be restrained. If the major cutting edge comprises more than three straight portions, the variation in cutting resistance may be increased due to a large contact length between the major cutting edge and a workpiece, and it is difficult to manufacture such a major cutting edge; therefore, one straight portion or two straight portions are preferable for forming the major cutting edge.

In order to improve surface roughness of the plane portion being machined, the throwaway insert may preferably comprise a minor cutting edge which is provided on a side edge of the cutting face so as to be connected to an end of the major cutting edge opposite to the corner cutting edge, and which is shaped so as to gradually deviate from an extended line of the major cutting edge toward the inside of the cutting face. A smoother plane portion may be obtained by using the minor cutting edge while disposing the minor cutting edge substantially along the plane perpendicular to the axis of the cutting tool main body. If the minor cutting edge is formed in a circular arc shape, the surface roughness of the finished surface may be further improved while preventing a large step from being formed in the plane portion at every feed of the cutting edge even when the minor cutting edge is not disposed strictly along the plane perpendicular to the axis of the cutting tool main body. When the minor cutting edge is formed in a circular arc shape, the radius of the circular arc may be preferably set to be 1 to 100 times D, where D is the diameter of an inscribed circle of the cutting face. If the radius of the circular arc is set to be out of the range, the above-mentioned effects may not be obtained. The throwaway cutting tool may comprise a shaft-shaped shank extending along the axis of rotation on the rear end portion of the cutting tool main body. If the throwaway cutting tool is held in an attachment hole of a holder which can be attached to the major spindle of a machine tool, dimensions including the diameter of cutting edge circle of the tool may preferably be indicated on a tip surface of the cutting tool main body.

DETAILED DESCRIPTION OF THE PREFERRED EMBODIMENTS

Figure 1:
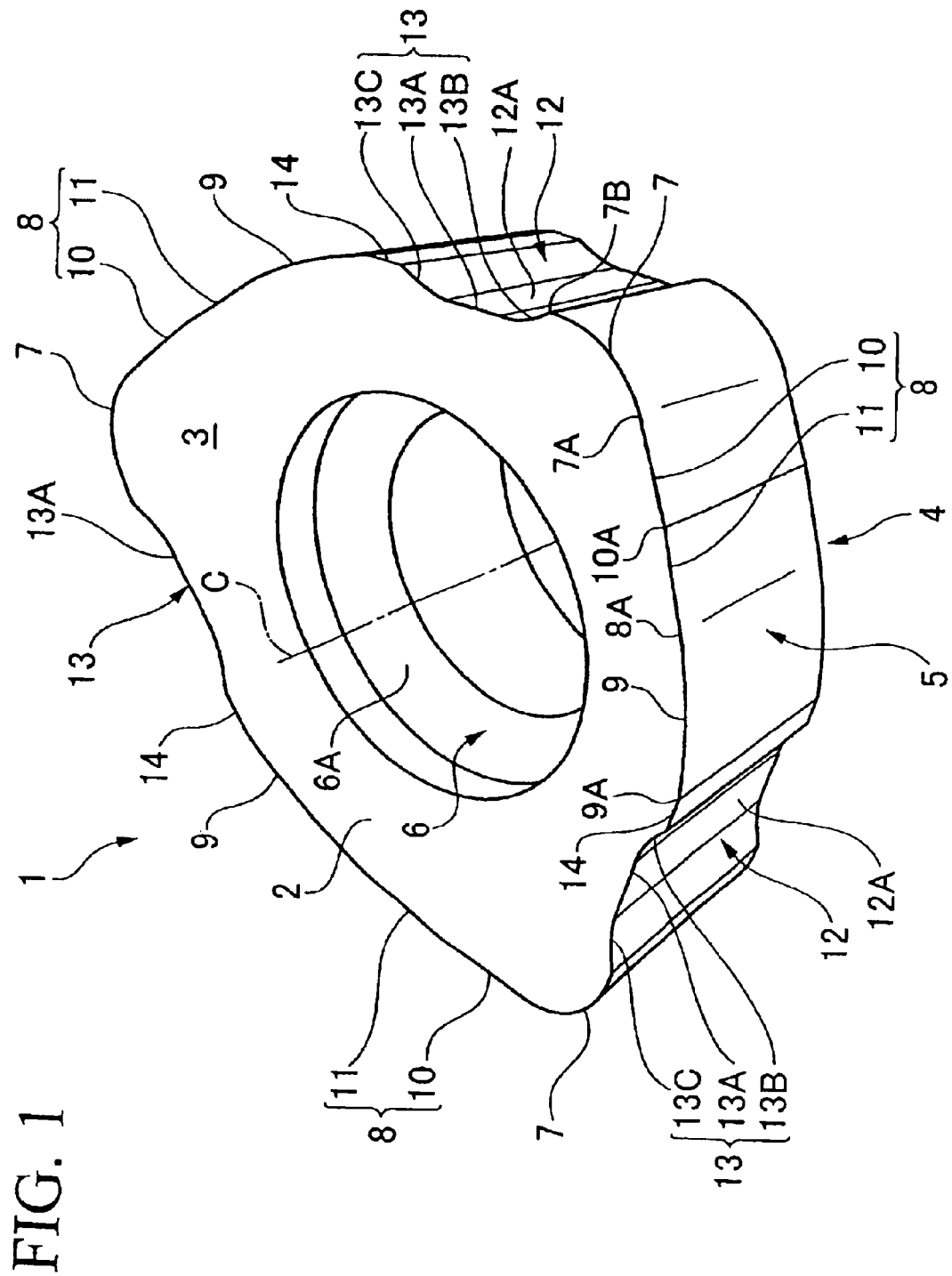
FIG. 1 is a perspective view showing a throwaway insert 1 according to a first embodiment of the present invention.

FIGS. 1 to 4 show a throwaway insert 1 according to a first embodiment of the present invention. An insert body 2 of the throwaway insert 1 of the present embodiment is made of hard material such as cemented carbide, and the throwaway insert 1 is substantially formed in an equilateral triangular plate shape (more specifically, in a nonequilateral hexagonal shape). One of equilateral triangle surfaces of the throwaway insert 1 is assigned as a cutting face 3, and the other surface is assigned as a seating surface 4 which is disposed in parallel to the cutting face 3. There are formed flanks 5 on the side surfaces surrounding the cutting face 3 and the seating surface 4, and cutting edges are formed along the intersecting ridges between the flanks 5 and the cutting face 3, i.e., along side edges of the cutting face 3. The throwaway insert 1 of the present embodiment is a positive throwaway insert in which the cutting face 3 and the flanks 5 intersect each other at acute angles so as to have cutting edges therebetween, and more specifically, the seating sur- face 4 is formed as a reduced analogue of the cutting face 3, i.e., each of the side surfaces of the throwaway insert 1 is inclined toward the inside of the insert body 2 as the distance from the cutting face 3 increases, and the distance from the seating surface 4 decreases. In the middle portions of the cutting face 3 and the seating surface 4, there is formed a attaching hole 6 which penetrates the insert body 2 in the direction of thickness, and which extends in a direction perpendicular to the cutting face 3 and the seating surface 4. The diameter of one of the apertures of the attaching hole 6 disposed in the cutting face 3 is made larger than that of the other aperture disposed in the seating surface 4 by forming a tapered portion 6A in the cutting face 3.

The throwaway insert 1 of the present embodiment is formed as a rotationally symmetrical shape such that the substantially equilateral triangular shape of the insert body 2 coincides with itself at every 120 degrees when being rotated about the central line C of the attaching hole 6. At each of corners of the triangular cutting face 3, there is formed a corner cutting edge 7 having a convex arc shape. A major cutting edge 8 is formed along a side edge of the cutting face 3 which is connected to a first end 7A (an end positioned in the clockwise direction about the central axis C from the corner in FIG. 2) of the corner cutting edge 7. A minor cutting edge 9 is formed along a side edge of the cutting face 3 which is connected to an end 8A (an end positioned in the clockwise direction about the central axis C from the major cutting edge 8 in FIG. 2) of the major cutting edge 8 positioned opposite to the corner cutting edge 7. The corner cutting edge 7 and the major cutting edge 8 are connected to each other at the end 7A, and the major cutting edge 8 and the minor cutting edge 9 are connected to each other at the end 8A, and thus the above-mentioned cutting edge is formed. Accordingly, in this embodiment, three cutting edges, each of which comprises the corner cutting edge 7, major cutting edge 8, and minor cutting edge 9, are provided along the side edges of the cutting face 3 of the insert body 2 in a rotationally symmetrical manner about the central axis C at every 120 degrees, which means that the throwaway insert 1 having one insert body 2 can be repeatedly used, three times, for cutting.

The radius "r" of the corner cutting edge 7 is set to be 0.05 to 0.5 times D, where D is the diameter of an inscribed circle of the cutting face 3, which will be explained below, and the central angle of the circular arc of the corner cutting edge 7 is set to be approximately 45 to 150 degrees, and the corner cutting edge 7 intersects a line drawn from the middle point of the circular arc to the central axis C. In this embodiment, the major cutting edge 8 connected to the end 7A of the corner cutting edge 7 comprises a first straight portion 10 which is smoothly connected to the arc-shaped corner cutting edge 7 at the end 7A, and which straightly extends along a tangent of the corner cutting edge 7 drawn at the end 7A, and a second straight portion 11 which intersects the first straight portion 10 at an obtuse angle, so as to form a convex V-shape configuration, at an end 10A that is positioned opposite to the corner cutting edge 7, and which also straightly extends. The length of cutting edge K of the first straight portion 10 is set to be less than the length of cutting edge L of the second straight portion 11, and the ratio K/L is set to be approximately 0.4 to 0.9.

Moreover, in this embodiment, the minor cutting edge 9, which is formed in a convex arc shape, is smoothly connected to the second straight portion 11 at the end 8A of the major cutting edge 8, i.e., at the end of the second straight portion 11 that is positioned opposite to the corner cutting edge 7. The minor cutting edge 8 is formed so as to gradually depart from an extended line of the major cutting edge 8 extending from the end 8A (an extended line of the second straight portion 11) as the distance from the end 8A increases, and the radius R thereof is set to be 1 to 100 times D, where D is the diameter of the inscribed circle of the cutting face 3, which is much greater than the radius "r" of the corner cutting edge 7. The length of the minor cutting edge 9 (i.e., the length of the chord of the convex arc defined by the minor cutting edge 9) is set to be 0.1 to 0.4 times D, where D is the diameter of the inscribed circle of the cutting face 3. In this embodiment, the minor cutting edge 9 is formed on middle portion of each of the side edges of the substantially equilateral triangle defined by the cutting face 3, and extends along each of the side edges; therefore, if it is assumed that a circle having the center thereof at the central axis C is gradually enlarged in the cutting face 3, the circle is inscribed in the cutting face 3 at the minor cutting edges 9, and the diameter of this circle is the diameter D of the inscribed circle of the cutting face 3.

Figure 2:
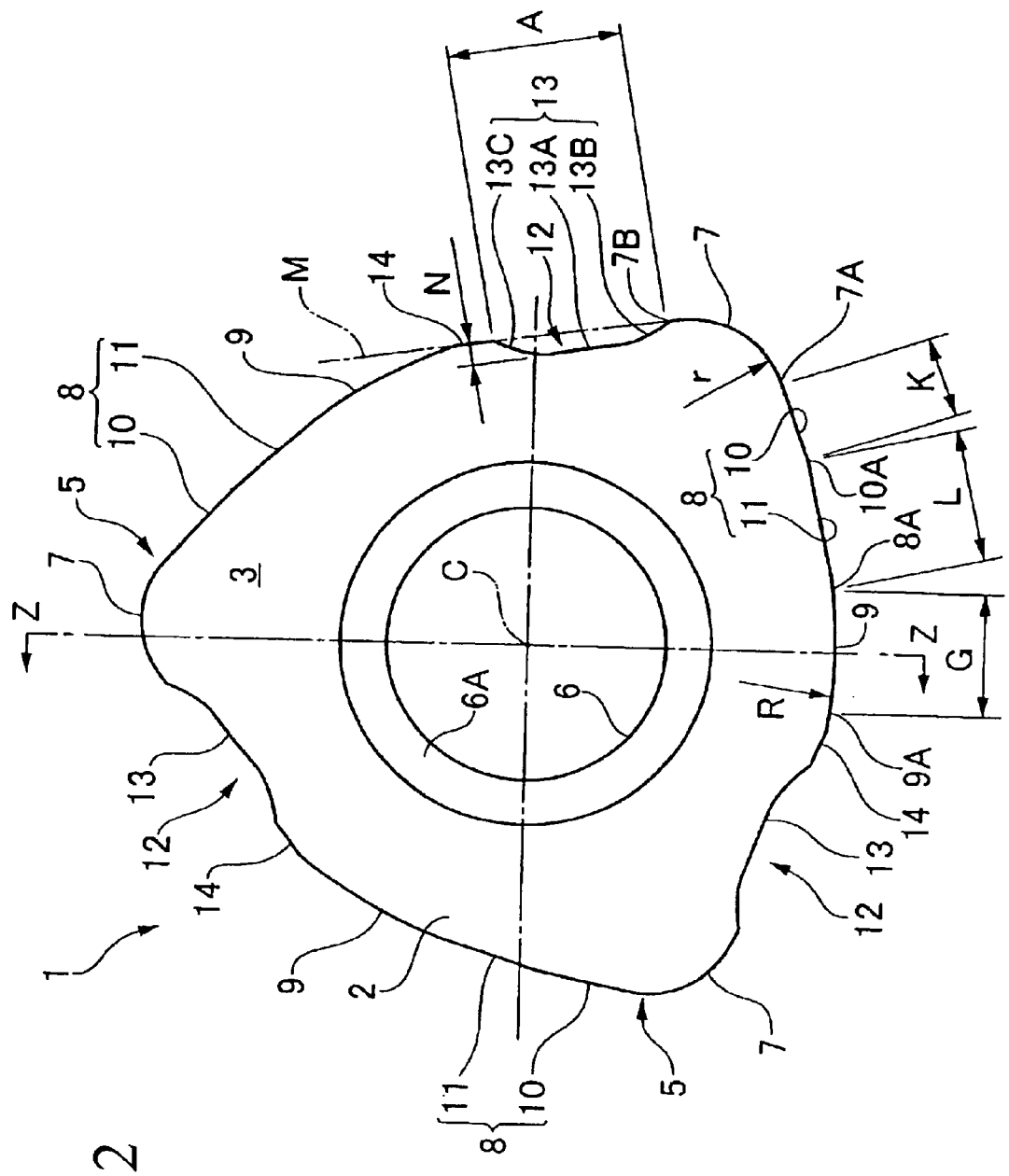
FIG. 2 is a plan view showing the throwaway insert 1 of the first embodiment.
Figure 3:
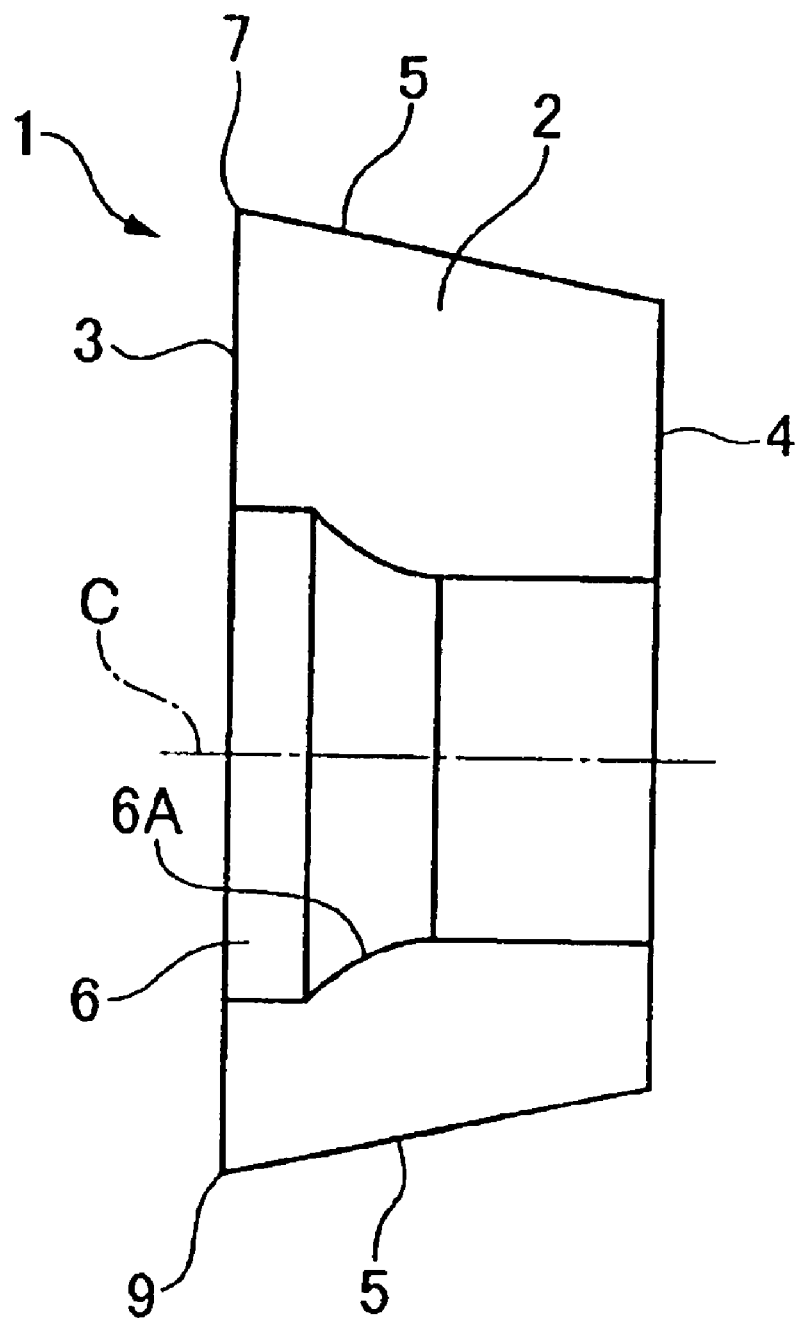
FIG. 3 is a cross-sectional view taken along the line Z—Z in FIG. 2.
Figure 4:
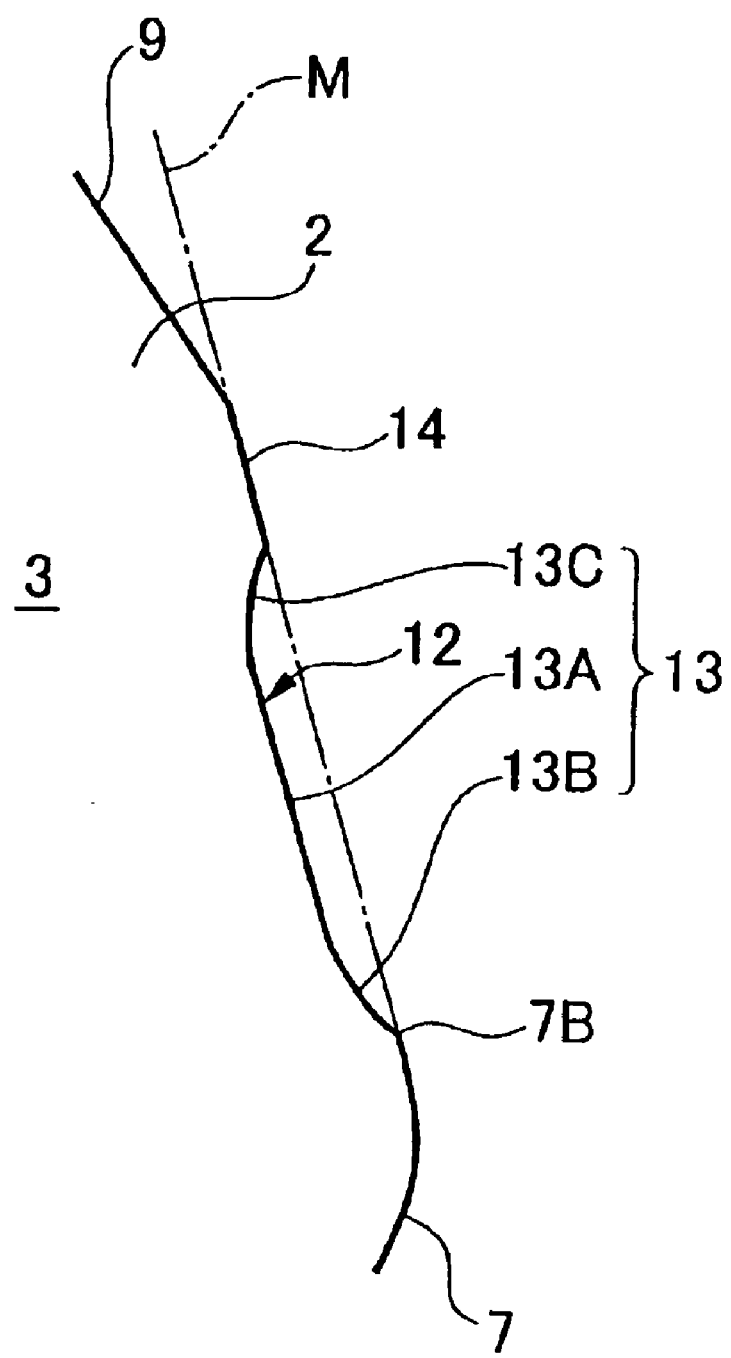
FIG. 4 is an enlarged plan view showing the vicinity of a concave portion 13 of the throwaway insert 1 of the first embodiment.
Figure 5:
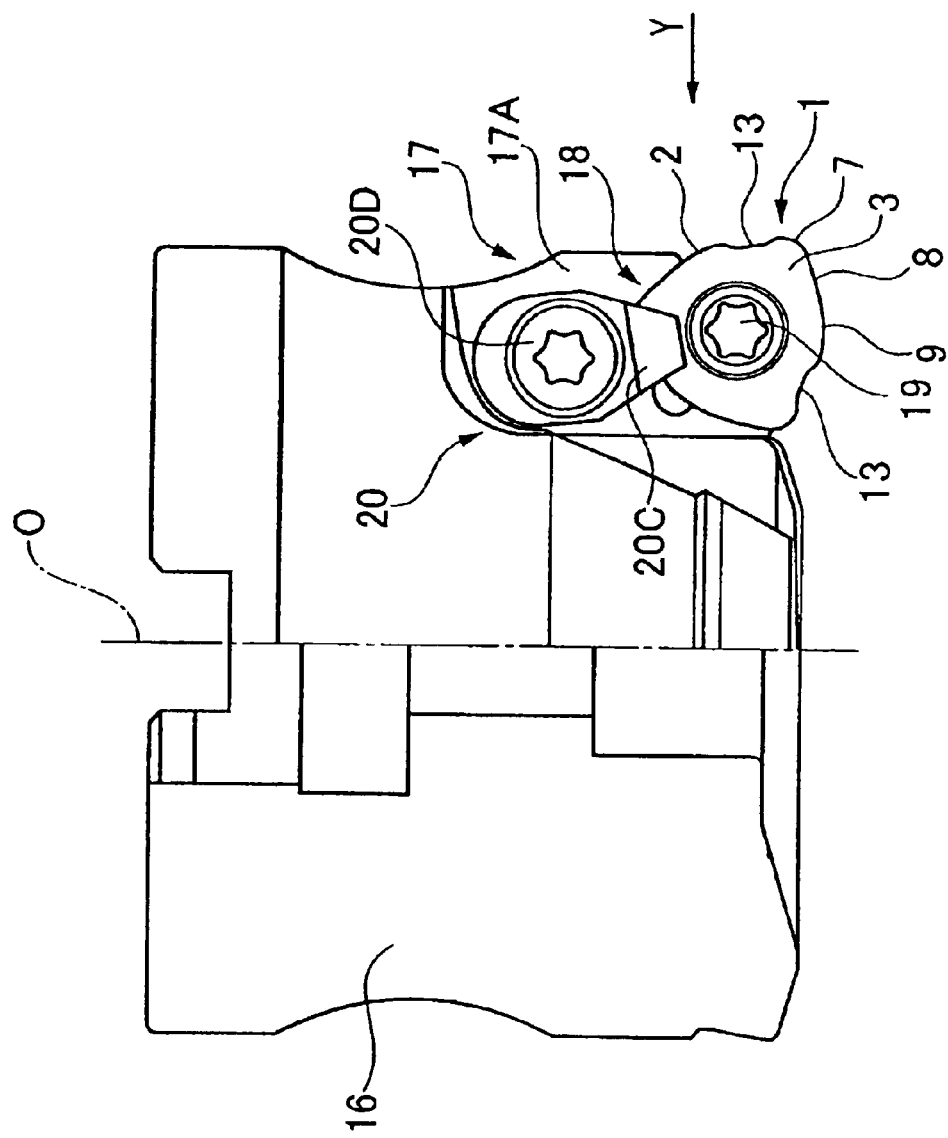
FIG. 5 is a partially cutaway side view showing a state in which a throwaway tool of a first embodiment of the present invention is provided with the throwaway inserts 1 of the first embodiment (note that a chip pocket 17, an insert attaching seat 18, etc., are not shown in some of the throwaway inserts 1).

A concave portion 13 is provided along the other side edge of the cutting face 3 that is connected to a second end 7B (an end positioned in the counterclockwise direction about the central axis C from the corner in FIG. 2) of the corner cutting edge 7 which is positioned opposite to the major cutting edge 8 so as to be adjacent to the second end 7B of the corner cutting edge 7. The concave portion 13 is formed so as to be made concave toward the inside of the cutting face 3 from a tangent M of the corner cutting edge 7 drawn at the second end 7B, i.e., the concave portion 13 is provided by forming a recess 12, which extends from the cutting face 3 to the seating surface 4, in the side surface of the insert body 2 that is connected to the side edge. In this embodiment, the concave portion 13 is formed so as to be connected to the second end 7B of the corner cutting edge 7, i.e., the concave portion 13 starts concaving toward the inside of the cutting face 3 right at the second end 7B. Moreover, in this embodiment, the bottom line 13A of the concave portion 13 is formed in a straight shape; therefore, the recess 12 formed in the side surface of the insert body 2 has a flat bottom surface 12A. Note that the bottom surface 12A of the recess 12, as well as the flank 5 on the side surface of the insert body 2 that is connected to the cutting edge (corner cutting edge 7, major cutting edge 8, and minor cutting edge 9), is inclined toward the inside of the insert body 2 as the distance from the cutting face 3 increases, and the distance from the seating surface 4 decreases, and the bottom surface 12A is connected to the cutting face 3 at an acute angle.

In this embodiment, the straight line of the bottom line 13A of the concave portion 13 is formed so as to extend in parallel to the tangent M of the corner cutting edge 7 drawn at the second end 7B. The end portions 13B and 13C of the concave portion 13 that are connected to the bottom line 13A are formed as concave curves which are smoothly connected to the straight line of the bottom line 13A, and which curve away from the insert body 2 as the distances from the bottom line 13A increase. Accordingly, the concave curve of the end portion 13B is connected to the convex curved corner cutting edge 7 at the second end 7B. Moreover, in this embodiment, the distance between the tangent M of the corner cutting edge 7 drawn at the second end 7B and the bottom line 13A of the concave portion 13 that extends in parallel to the tangent M, i.e., the depth N of the concave portion 13 is set to be 0.01 to 0.05 times D, where D is the diameter of the inscribed circle, and the length A of the concave portion 13 along the tangent M is set to be 0.2 to 0.5 times D. Note that the concave portion 13 is not made concave toward the inside of the cutting face 3 across the inscribed circle which is inscribed in the cutting face 3 at the minor cutting edges 9.

In the throwaway insert 1 of the present embodiment in which the insert body 2 is formed as a rotationally symmetrical shape at every 120 degrees about the central axis C of the attaching hole 6, on each of the side edges of substantially equilateral triangle of the cutting face 3, there are provided the major cutting edge 8 and minor cutting edge 9 which extend from the first end 7A of the corner cutting edge 7 that is formed at one of the pair of corners having the side edge therebetween, and also there is provided the concave portion 13 connected to the second end 7B of the corner cutting edge 7 formed at other corner. The major cutting edge 8 and the concave portion 13 having the minor cutting edge therebetween, i.e., approximately in the middle of the side edge, intersect each other at an obtuse angle via the minor cutting edge 9. As a result, the cutting face 3 is, more specifically, formed in a nonequilateral hexagonal shape. Between the minor cutting edge 9 and the concave portion 13 formed on the same side edge, there is provided a straight portion 14 having a very short length. The straight portion 14 extends along the tangent M of the corner cutting edge 7, which is connected to the concave portion 13, drawn at the second end 7B, and the straight portion 14 intersects the chord of the convex arc shaped minor cutting edge 9 at an obtuse angle, in other words, the tangent M along which the straight portion 14 extends and the chord of the minor cutting edge 9 intersect each other at an obtuse angle. When the minor cutting edge 9 is deemed to be a side of a polygon, the major cutting edge 8 and the concave portion 13, which are formed on the same side edge, intersect the minor cutting edge 9 with obtuse angles, respectively. Accordingly, when the major cutting edge 8 is deemed to be a side of a polygon, the cutting face 3 is formed in substantially a nonequilateral nonagon, and when the first and second straight portion 10 and 11 of the major cutting edge 8 are deemed to be two sides of a polygon, the cutting face 3 is formed in substantially a nonequilateral dodecagon.

Figure 6:
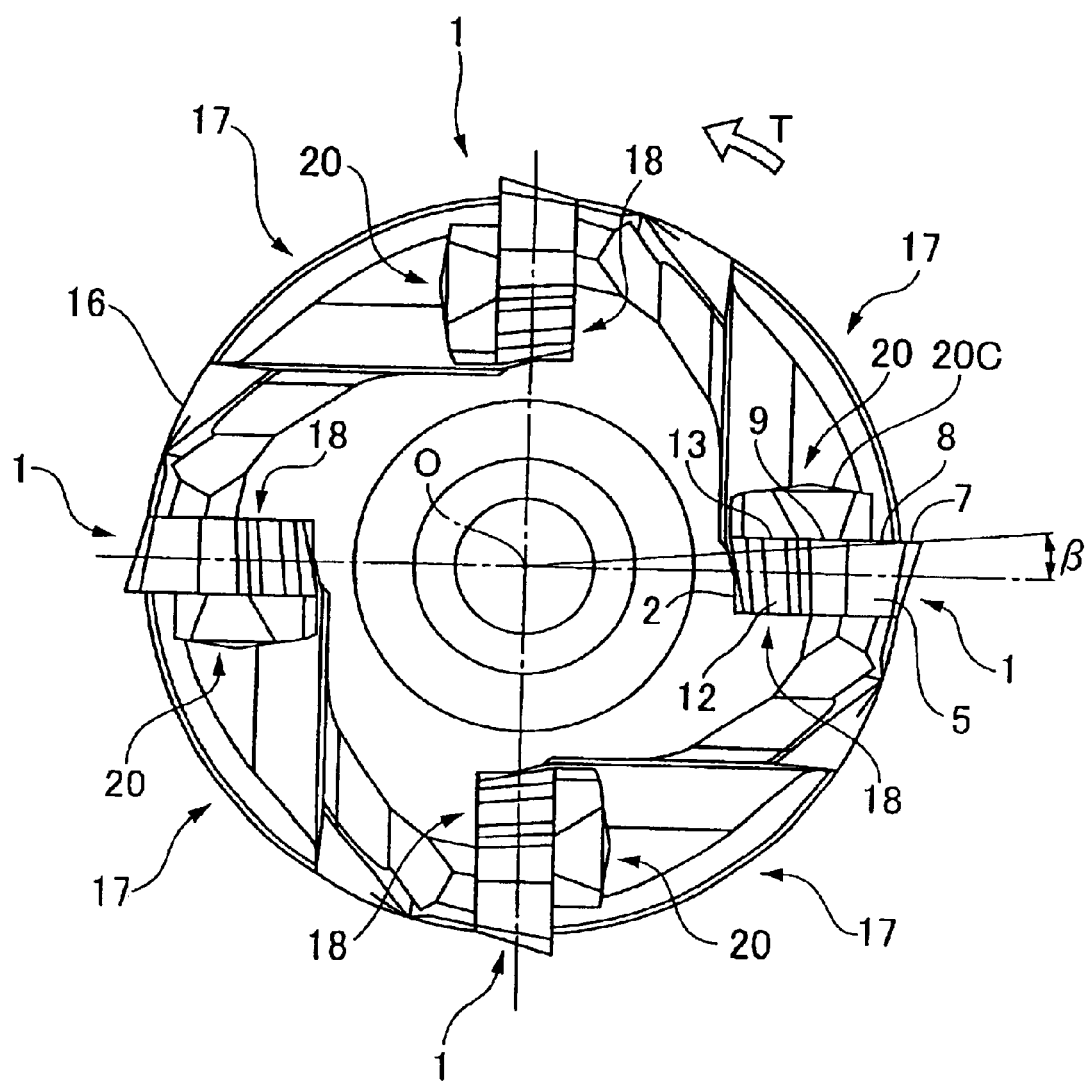
FIG. 6 is a bottom view showing the throwaway tool of the first embodiment as viewed from the distal end of an axis O.
Figure 7:
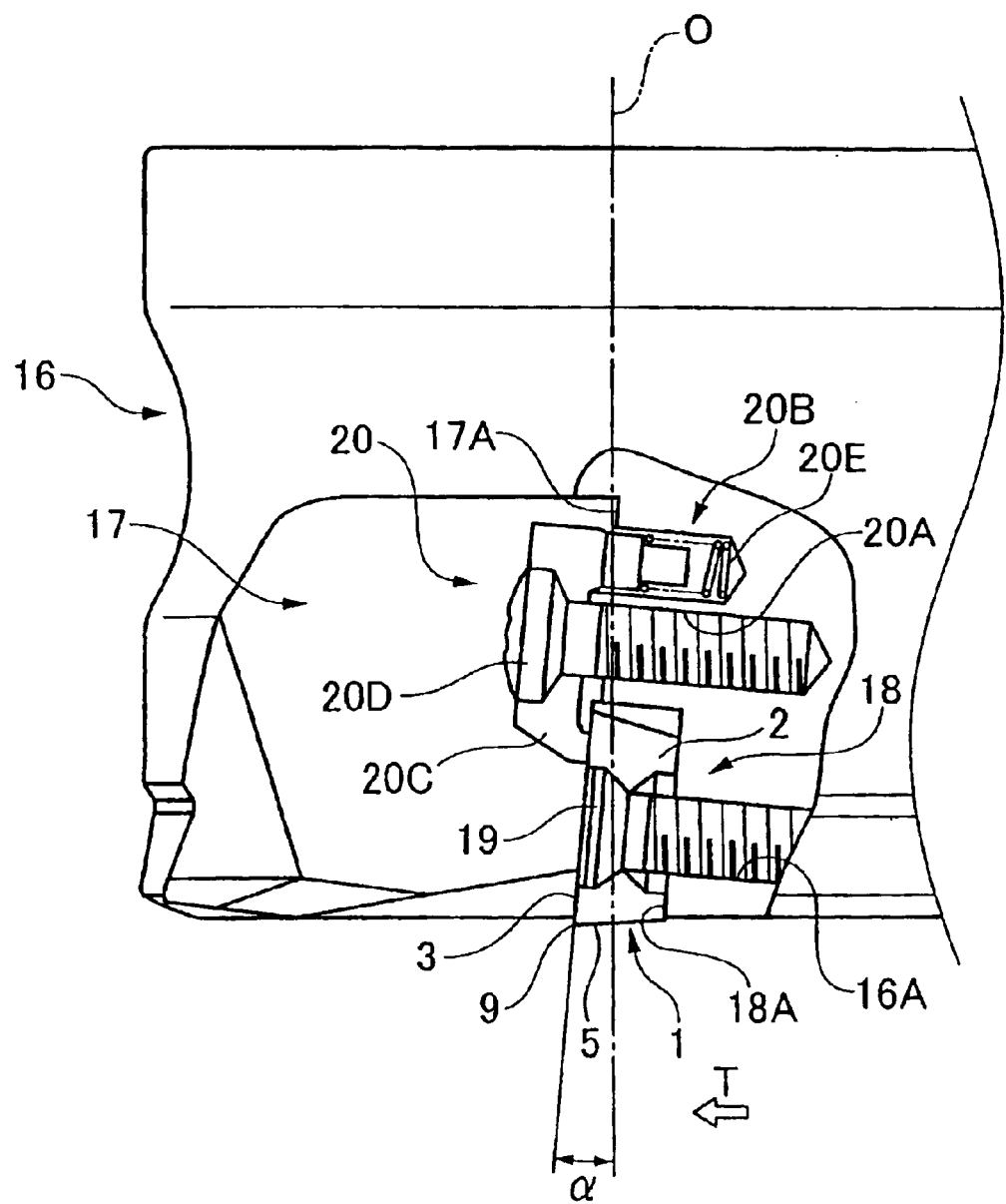
FIG. 7 is a partially cutaway view as viewed in the direction indicated by the arrow Y in FIG. 5.
Figure 8:
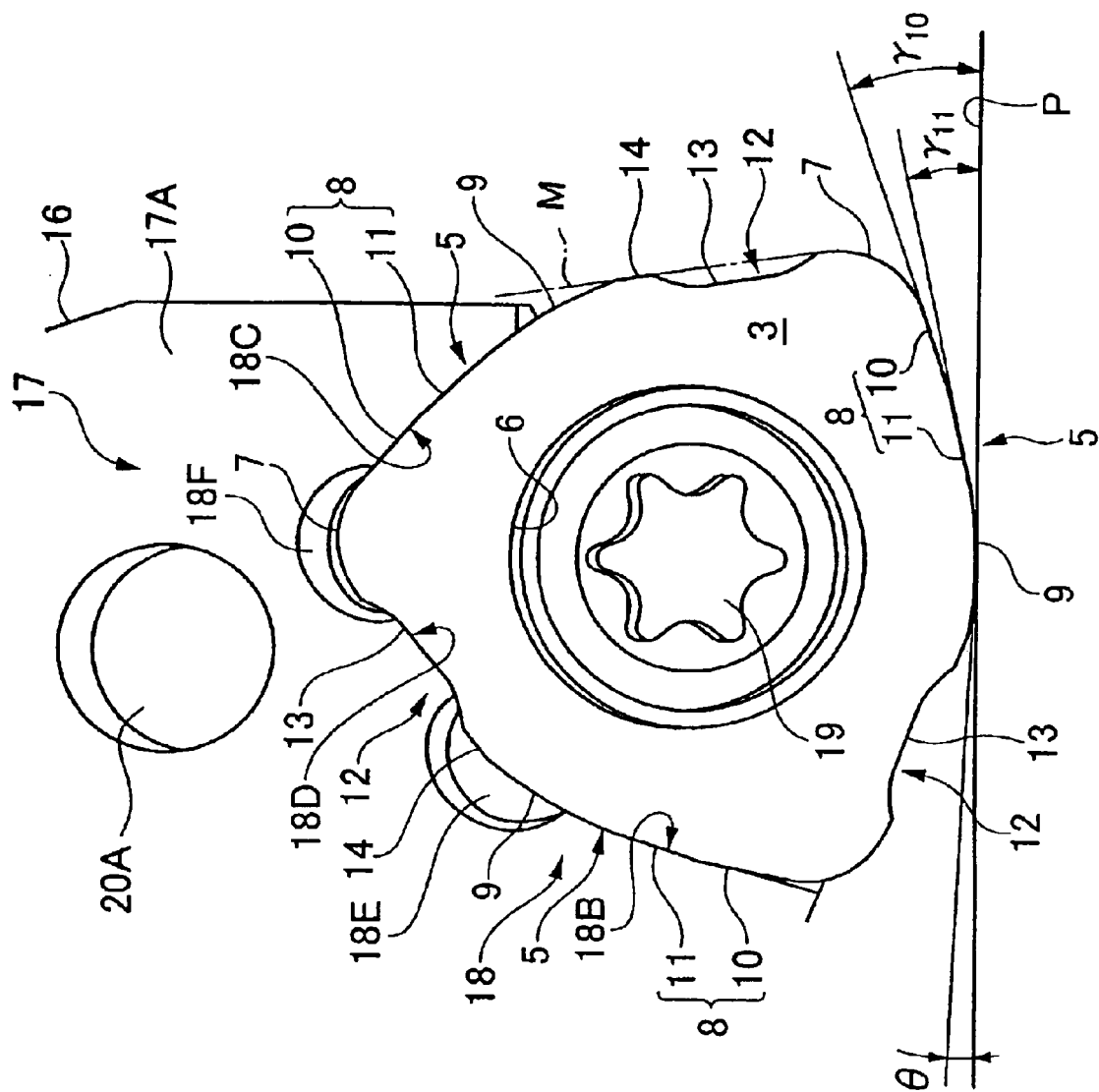
FIG. 8 shows the throwaway insert 1 of the first embodiment attached to the throwaway tool of the first embodiment as viewed in the direction of rotation of the cutting tool indicated by the arrow T (note that a clamp mechanism 20 is not shown).

Next, FIGS. 5 to 8 show a first embodiment of a cutting tool according to the present invention, which is provided with the throwaway insert 1. The cutting tool of the present embodiment comprises a cutting tool main body 16 formed in substantially a cylindrical shape having an axis O at the center thereof. The throwaway insert 1 is detachably attached to an outer periphery of the distal end of the cutting tool main body 16. A cutting operation is performed for making a plane portion or wall in a workpiece to be machined by attaching the proximal end of the cutting tool main body 16 to the main spindle of a machine tool, and by moving the cutting tool main body 16 in a direction across the axis O while rotating the cutting tool main body 16 about the axis O in a direction indicated by the arrow T in FIGS. 5 and 7. In this embodiment, as shown in FIG. 6, there are formed chip pockets 17 (four chip pockets 17) in the outer periphery of the distal end of the cutting tool main body 16 by removing material, in L-shape as viewed in the direction of the axis O, from the outer periphery of the distal end of the cutting tool main body 16 with substantially the same intervals in the circumference. The throwaway insert 1 according to the above embodiment is attached to each of insert attaching seats 18 each of which is formed in the distal end portion of a leading wall 17A facing in the direction T of rotation of the cutting tool. Accordingly, a plurality of throwaway inserts 1 (four throwaway inserts 1 in this embodiment) are attached to the cutting tool main body 16 with the same intervals in the circumference. Note that the chip pockets 17 may be formed with uneven intervals in the circumference.

The insert attaching seat 18 is formed as a recess which opens toward the distal end and the outer periphery of the cutting tool main body 16. The insert attaching seat 18 comprises a back surface 18A which is formed as a surface stepped in the direction opposite to the direction T of rotation from the leading wall 17A, walls (support surfaces) 18B and 18C connecting the back surface 18A to the leading wall 17A, and convex portion 18D. In the cutting tool main body 16, and more specifically, in the middle of the back surface 18A, which is formed as a plane extending in parallel to the axis O, or extending so as to incline in the direction opposite to the direction T of rotation as the distance from the proximal end of the cutting tool main body 16 decreases, there is formed a threaded hole 16A extending perpendicular to the back surface 18A. The wall 18B, which is connected to the inside portion of the insert attaching surface 18, extends from the distal end of the cutting tool main body 16 toward the proximal end and the outside portion of the cutting tool main body 16 while substantially facing outwardly with respect to the cutting tool main body 16. The wall 18C, which is connected to the outside portion of the insert attaching surface 18, extends from the outer periphery of the cutting tool main body 16 toward the proximal end and inside portion of the cutting tool main body 16. At least portions of the walls 18B and 18C adjacent to the wall 17A are formed as planes each of which inclines with an angle corresponding to the inclination of the flank 5 with respect to the seating surface 4 of the insert body 2. The convex portion 18D, which is connected to the inside portion of the insert attaching surface 18, is formed between the walls 18B and 18C so as to project toward the distal end and the outside portion of the cutting tool main body 16. The peak surface of the convex portion 18D is formed as a plane which inclines with an angle corresponding to the inclination of the bottom surface 12A of the recess 12 with respect to the seating surface 4 of the insert body 2, and the width of the peak surface is set to be slightly less than that the bottom surface 12A. In addition, half circular relief portions 18E and 18F are formed between the wall 18B and the convex portion 18D, and between the wall 18C and the convex portion 18D, respectively.

The throwaway insert 1 is attached to the insert attaching surface 18 configured as described above in such a manner that a side surface of the insert body 2 is directed toward the distal end of the cutting tool main body 16, that the cutting face 3 is directed in the direction of rotation T, and that the seating surface 4 is abutted against the back surface 18A. As a result, the major cutting edge 8 and minor cutting edge 9, which have the flank 5 on the side surface, are projected distally in the axial direction the cutting tool main body 16, the corner cutting edge 7 connected to the major cutting edge 8 is projected radially and outwardly from the cutting tool main body 16, and the concave portion 13, which is disposed adjacent to the second end 7B of the corner cutting edge 7, is directed outward as viewed from the center of the cutting tool main body 16. On the other hand, with regard to the side edge of the cutting face 3 that opposes the corner cutting edge which is projected radially and outwardly from the distal end of the cutting tool main body 16, the flank 5, which is connected to the second straight portion 11 of the major cutting edge 8 formed in the above side edge, is abutted against the wall 18B connected to the insert attaching surface 18, and the convex portion 18D projects into the recess 12 connected to the concave portion 13 while the peak surface thereof is abutted against the bottom surface 12A. As a result, the rotation of the insert body 2 about the central axis C is restrained. In addition, the minor cutting edge 9 formed between the major cutting edge 8 and the concave portion 13, and straight portion 14 are substantially accommodated in the relief portion 18E formed between the wall 18B and the convex portion 18D. The corner cutting edge 7 connected to the concave portion 13 is directed toward the proximal end of the cutting tool main body 16, and is substantially accommodated in the relief portion 18F formed between the convex portion 18D and the wall 18C. Moreover, the flank 5, which is connected to the second straight portion 11 of the major cutting edge 8 extending from the end 7A of the above corner cutting edge 7, is abutted against the wall 18C connected to the insert attaching surface 18. The throwaway insert 1, which seats on the insert attaching surface 18 in a manner explained above, is detachably fixed to the cutting tool main body 16 by inserting a clamp screw 19 into the attaching hole 6, and by engaging the clamp screw 19 with the threaded hole 16A.

In this embodiment, in addition to the clamp screw 19, another clamp mechanism 20 is provided to the cutting tool main body 16 in order to further ensure fixing rigidity of the throwaway insert 1. The clamp mechanism 20 comprises a clamp threaded hole 20A and a hole 20B smaller than the clamp threaded hole 20A, which are formed in the wall 17A of the chip pocket 17, and more specifically, in a position closer to the distal end of the cutting tool main body 16 than from the insert attaching seat 18. The clamp mechanism 20 further comprises a clamp bridge 20C which is adapted to extend over the cutting face 3 of the throwaway insert 1, and which has a pin portion that is to be inserted into the hole 20B, a clamp screw 20D which is adapted to engage the clamp threaded hole 20A through the middle portion of the clamp bridge 20C, and a coil spring 20E which is adapted to be accommodated in the hole 20B with the pin portion of the clamp bridge 20C. The throwaway insert 1 can be firmly fixed to the cutting tool main body 16 by engaging the clamp screw 20 with the clamp threaded hole 20A and tightening the same so that the tip portion of the clamp bridge 20C presses the cutting face 3 of the insert body 2 toward the back surface 18A of the insert attaching seat 18. On the other hand, by loosening the clamp screw 20D, the clamp bridge 20C is pushed back by the coil spring 20E, whereby the pressed state of the throwaway insert 1 is rapidly dissolved.

In the throwaway insert 1 fixed to the cutting tool main body 16 in a manner described above, because the back surface 18A of the insert attaching seat 18 is formed as a plane extending in parallel to the axis O, or extending so as to incline in the direction opposite to the direction T of rotation as the distance from the proximal end of the cutting tool main body 16 decreases, a positive or 0 degree of axial rake angle a is applied to the major cutting edge 8 and minor cutting edge 9 which are projected distally in the axial direction of the cutting tool main body 16, and to the corner cutting edge 7 which is projected radially and outwardly from the cutting tool main body 16 from the distal end thereof. On the other hand, in this embodiment, a negative radial rake angle β is applied to the major cutting edge 8, minor cutting edge 9, and corner cutting edge 7, as shown in FIG. 6; however, the radial rake angle β may be set to be positive value or 0 degree.

In addition, the major cutting edge 8 is disposed so as to project distally in the axial direction of the cutting tool main body 16 as the distance from the end 7A of the corner cutting edge 7 increases, and as the distance from the center the cutting tool main body 16 decreases, and thus a predetermined cutting edge angle ? is defined between the major cutting edge 8 and a plane P which is perpendicular to the axis O. In the case of the throwaway insert 1 of this embodiment, because the major cutting edge 8 is formed by the straight portions 10 and 11, the cutting edge angle ? comprises a relatively large cutting edge angle ?10 defined by the first straight portion 10 disposed outward with respect to the cutting tool main body 16, and a relatively small cutting edge angle ?11 defined by the second straight portion 11 disposed inward with respect to the cutting tool main body 16. The cutting edge angle ?10 defined by the first straight portion 10 may be preferably set to be 15 to 30 degrees, and the cutting edge angle ?11 defined by the second straight portion 11 may be preferably set to be 5 to 20 degrees. The cutting edge angle ?10 is set to be greater than the cutting edge angle ?11. With regard to the convex shaped minor cutting edge 9 connected to the end 8A of the major cutting edge 8, the chord extending from the end 8A to the end 9A, which is positioned opposite to the end 8A (i.e., the end of the straight portion 14), is disposed along the plane P, or alternatively, the chord may be inclined with a relatively small angle ?, which is approximately from 0 to 3 degrees, toward the proximal end of the cutting tool main body 16 as the distance from the center of the cutting tool main body 16 decreases.

Figure 9:
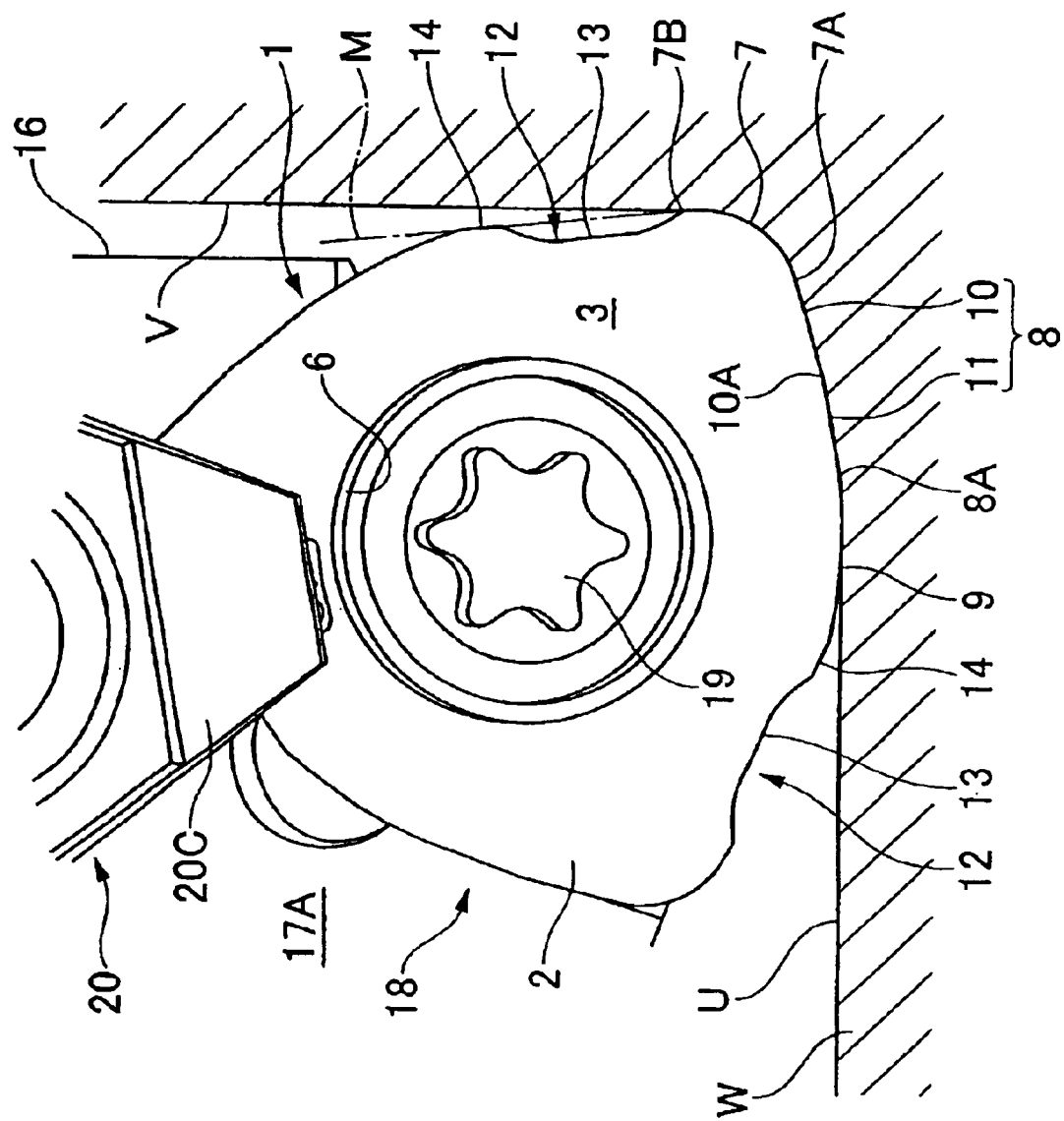
FIG. 9 is a diagram showing a state in which a plane portion U and a vertically extending wall V are formed in a workpiece W using the throwaway tool of the first embodiment.

On the other hand, the corner cutting edge 7, which is projected outward from the outer periphery of the cutting tool main body 16, extends from the end 7A that is connected to the major cutting edge 8 to the second end 7B via a portion of the corner cutting edge 7 which extends outward and toward the proximal end of the cutting tool main body 16, and which includes the outermost point, and via another portion of the corner cutting edge 7 which extends inward and toward the proximal end of the cutting tool main body 16. Accordingly, the tangent M drawn at the second end 7B is inclined inward as the distance from the proximal end of the cutting tool main body 16 along the axis O decreases. In the case of the throwaway insert 1 configured as described above, and if it is assumed that a vertically extending wall V is formed in a workpiece W, as shown in FIG. 9, using the cutting tool provided with the throwaway insert 1, because the concave portion 13 is formed in the side edge of the cutting face 3 so as to be adjacent to the second end 7B of the corner cutting edge, it is possible to ensure a greater gap (clearance) between the vertically extending wall V and the throwaway insert 1 if compared with the case in which a conventional throwaway insert and a conventional cutting tool are used in which the side edge connected to the second end 7B of the corner cutting edge 7 is formed along the tangent M of the corner cutting edge 7 drawn at the second end 7B. Therefore, according to the throwaway insert 1 configured as described above and according to the cutting tool provided with the throwaway insert 1, it is possible to prevent a machined surface (the vertically extending wall V) from being damaged by cut chips packed in the gap, or to prevent chipping-off of the throwaway insert 1 even when a cutting operation is performed while the axis O is disposed horizontally, and as a result, it is possible to form machined surfaces having high quality for a long period.

Moreover, in the case of the throwaway insert 1 of the present embodiment, the concave portion 13 is formed so as to be connected to the second end 7B of the corner cutting edge 7, and more specifically, the concave portion 13 starts concaving toward the inside of the cutting face 3, i.e., toward the inside of the cutting tool, right at the second end 7B which is located at a position closer to the proximal end and the center of the cutting tool main body 16 as viewed from the outermost point of the convex arc-shaped corner cutting edge 7. Accordingly, it is possible to ensure a large gap between the side edge of the cutting face 3 which is disposed outward from the cutting tool and the vertically extending wall V, and between the side surface of the insert body 2 and the vertically extending wall V, while on the other hand, some depth of cut is ensured by the corner cutting edge 7, and as a result, cut chips are reliably prevented from being packed in the gap. Note that, although the concave portion 13 is formed so as to be connected to the second end 7B of the corner cutting edge 7 in this embodiment, packing of cut chips can be sufficiently prevented even if a straight portion extending along the tangent M drawn at the second end 7B is formed between the second end 7B and concave portion 13 as long as the length of the straight portion is sufficiently small, e.g., less than 2 mm.

In addition, in the case of the throwaway insert 1 configured as described above, the insert body 2 is formed in a shape which is rotationally symmetrical about the central axis C of the attaching hole 6 at every 120 degrees; therefore, when the throwaway insert 1 is attached to the insert attaching seat 18 in the cutting tool main body 16, the concave portion 13 formed in a side edge of the cutting face 3 which opposes the corner cutting edge 7 projecting outward from the cutting tool main body 16 is disposed inward and toward the proximal end of the cutting tool main body 16; therefore, it is possible to increase fixing rigidity between the throwaway insert 1 and the cutting tool main body 16 by providing the convex portion 18D, which is engageable with the concave portion 13, at the insert attaching seat 18 in the cutting tool main body 16 as the case of the above-mentioned cutting tool. As a result, it is possible to prevent the insert body 2 from being shifted while rotating about the central axis C even when, for example, the direction of cutting load applied to the throwaway insert 1 changes between when the plane portion U is machined and when the vertically extending wall V is machined in a workpiece W; therefore, a machining operation having high accuracy may be achieved. Moreover, in this embodiment, because the throwaway insert 1 is fixed to the cutting tool main body 16 in such a manner that the clamp screw 19 is inserted into the attaching hole 6, the clamp screw 19 is engaged with the threaded hole 16A, and the throwaway insert 1 is pressed against the insert attaching seat 18 by the clamp mechanism 20, it is possible to further increase fixing rigidity between the throwaway insert 1 and the cutting tool main body 16, and as a result, it is possible to achieve a machining operation having higher accuracy by restraining position variations of the corner cutting edge 7, major cutting edge 8, and minor cutting edge 9, which are used for cutting, among the throwaway inserts 1 attached to the cutting tool main body 16.

Furthermore, in the case of the throwaway insert 1 of the present embodiment, the bottom line 13A of the concave portion 13 is formed in a straight shape, and therefore, the recess 12 formed in the side surface of the insert body 2 has a flat bottom surface 12A, while on the other hand, the peak surface of the convex portion 18D is also formed as a plane so as to be engageable with the bottom surface 12A without play; therefore, a high fixing rigidity can be ensured specifically against force making the throwaway insert 1 rotate about the central axis C thereof due to changes in cutting load as explained above, and as a result, a higher accuracy can be achieved in a machining operation. In addition, in this embodiment, because at least portions of the walls 18B and 18C of the insert attaching seat 18 adjacent to the wall 17A are made as planes, and because the flank 5 in the side surface of the insert body 2 that is connected to the major cutting edge 8, and more specifically, the flank 5 having a relatively large area that is connected to the second straight portion 11 having a relatively long cutting edge length L, is abutted against the walls 18B and 18C, a high fixing rigidity can be ensured specifically against force making the throwaway insert 1 rotate about the central axis C thereof.

Figure 10:
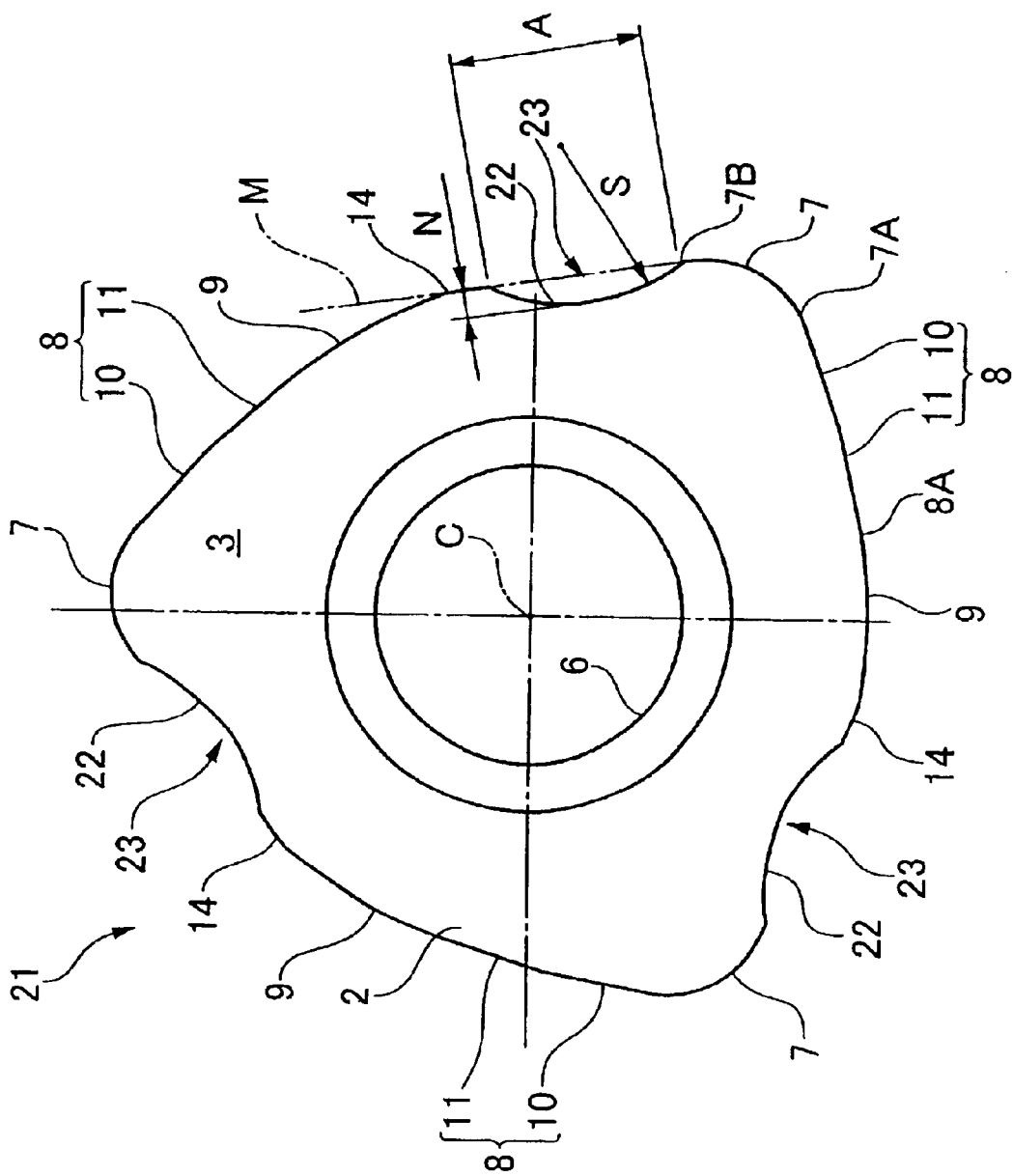
FIG. 10 is a plan view showing a throwaway insert 21 according to a second embodiment of the present invention.

In the above embodiment, the bottom line 13A of the concave portion 13 is made in a straight shape; however, as an alternative second embodiment, the bottom line of the concave portion 22 may be formed in a curved shape as shown in FIG. 10. With regard to the throwaway insert 21 in the second embodiment, as well as throwaway inserts 31 to 51 in third to fifth embodiments which will be explained below, the same reference symbols are applied to the same major elements as in the first embodiment, and explanations thereof will be omitted. In the second embodiment, the bottom surface (not shown) of the recess 23 connected to the concave portion 22 of the insert body 2 is made as curved and concave surface, such as a concave cylindrical surface, which is made concave toward the inside of the insert body 2, and therefore, the concave portion 22, which is formed as an intersecting ridge between the bottom surface and the cutting surface 3, is formed as a curved and concave line, such as a concave arc, which extends from the second end 7B of the corner cutting edge 7, which is made concave toward the inside of the cutting face 3 along the entire length of the concave portion 22. In the case, as in this embodiment, in which the bottom line of the concave portion 22 is formed as a curved shape, the radius of curvature of the bottom line, e.g., the radius of an arc if the bottom line of the concave portion 22 is formed as a concave arc, may be preferably set to be 0.5 to 2.0 times D, where D is the diameter of the inscribed circle.

According to the throwaway insert 21 of the second embodiment, a high fixing rigidity can be ensured specifically against force making the throwaway insert 21 rotate about the central axis C thereof by engaging the convex portion 18D of the insert attaching seat 18 with the recess 23 as in the cutting tool of the above embodiment, while on the other hand, the depth N of the concave portion 22 may be greater than that of the concave portion 13 in the first embodiment, whereby the gap formed with the vertically extending wall V increases; therefore, it is possible to more reliably prevent cut chips from being packed. In addition, if the bottom surface of the recess 23 is formed as a concave cylindrical surface, and therefore, if the concave portion 22 is formed as an arc along the entire length thereof, it is easy to form the recess 23 in the insert body 2 and to form the concave portion 23 in the cutting face 3. Furthermore, portions at which two straight lines intersect are prevented from being formed in the concave portion 22, and thus it is possible to prevent cracks from propagating from corner portions in the insert body 2 when an excessive load is applied to the insert body 2, in contrast to the case in which not only the bottom line of the concave portion, but also both end portions connected to the bottom line are formed in a straight shape, i.e., the concave portion is formed as a trapezoid or a rectangle. If the bottom surface of the recess 23 is formed as a concave and curved surface as in the second embodiment, the convex portion 18D, which is adjacent to the insert attaching seat 18 of the cutting tool to which the throwaway insert 21 is to be attached, may be formed as a convex and curved surface that matches the bottom surface of the recess 23.

In the throwaway insert 1 of the first embodiment, because the major cutting edge 8, which comprises the first straight portion 10 that extends along the tangent of the arc-shaped corner cutting edge 7 drawn at the end 7A, and the second straight portion 11 that intersects the first straight portion 10 at the end 10A at an obtuse angle, is connected to the end 7A of the corner cutting edge 7 that is positioned opposite to the concave portion 13, the contact length between a workpiece W and the major cutting edge 8 becomes shorter when compared with the case in which the major cutting edge is directly connected to the corner cutting edge while being formed in an arc shape; therefore, the variation in cutting load can be restrained. In addition, because the flank 5 in the side surface of the insert body 2 that is connected to the major cutting edge 8 may be formed as a plane, it is possible to ensure a high fixing rigidity of the throwaway insert by forming the walls 18B and 18C adjacent to the insert attaching seat 18 in a flat shape, and by abutting the flank against the walls 18B and 18C. Moreover, if the major cutting edge 8 comprises the first and second straight portions 10 and 11, i.e., the major cutting edge 8 is formed as a folded line, a cut chip may be divided into two at the end 10A at which the first and second straight portions 10 and 11 intersect each other, chip separation performance can be improved. In addition, because the cutting edge angle ?10 defined by the first straight portion 10 disposed outward with respect to the cutting tool main body 16 is greater than the cutting edge angle ?11 defined by the second straight portion 11 disposed inward with respect to the cutting tool main body 16, and because the length of cutting edge L of the second straight portion 11 is set to be greater than the length of cutting edge K of the first straight portion 10, it is possible to effectively perform a cutting operation when, for example, the plane portion U is machined in the workpiece W by exclusively using the second straight portion 11 while applying a relatively small depth of cut and a relatively large feed rate, and on the other hand, it is possible to restrict increase in cutting force when the vertically extending wall V is machined by using the first straight portion 10 having the greater cutting edge angle ?10 and the corner cutting edge 7 while applying a relatively large depth of cut.

Figure 11:
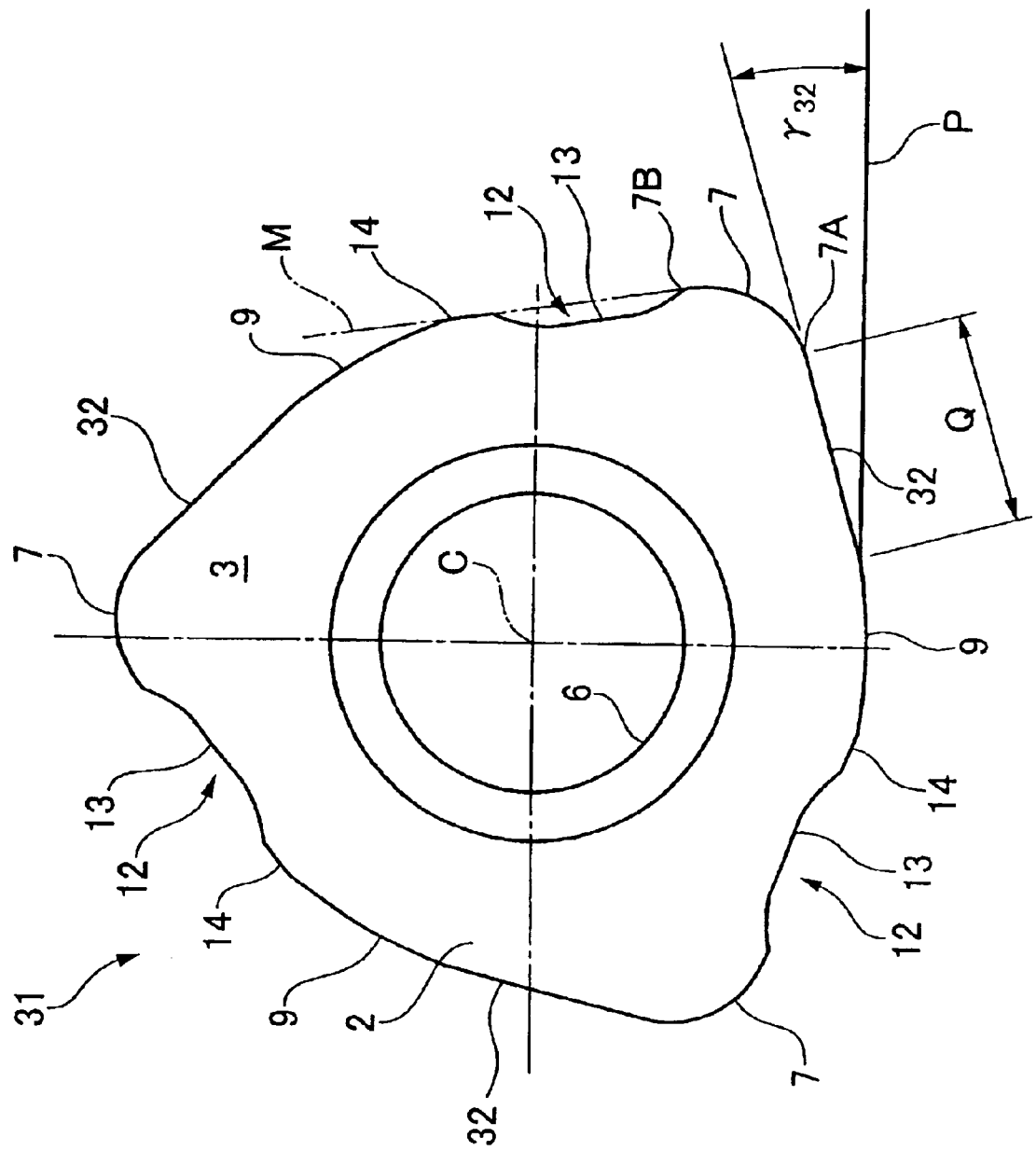
FIG. 11 is a plan view showing a throwaway insert 31 according to a third embodiment of the present invention.

In contrast to the first embodiment in which the major cutting edge 8 comprises two straight portions 10 and 11, in the throwaway insert 31 as an alternative third embodiment, the major cutting edge 32 may be formed in a straight shape having a single cutting edge angle ?32 as shown in FIG. 11. In this case, when the major cutting edge 32, the minor cutting edge 9, and the concave portion 13 are deemed to be sides of a polygon, respectively, the insert body 2 is formed in substantially a nonequilateral nonagon. According to the third embodiment, the length of the cutting edge Q of the major cutting edge 32 can be made shorter than that in the first embodiment, and thus the contact length with the workpiece W can be made shorter. Moreover, it is easy to form the major cutting edge 32 and the flank 33 that is connected to the major cutting edge 32. Furthermore, because the area of the flank 33 consisting of a single plane can be made larger than the area of the flank 5 connected to the second straight portion 11 in the first embodiment, a larger contact area can be ensured between the throwaway insert 31 and the walls 18B and 18C adjacent to the insert attaching seat 18; therefore, a higher fixing rigidity of the throwaway insert can be ensured. The major cutting edge 8 or 32 is preferably configured by a single straight portion as in the third embodiment, or by two straight portions 10 and 11 as in the first embodiment, because, if the major cutting edge is formed by three or more straight portions, the length of cutting edge, i.e., the contact length between the cutting edge and a workpiece W becomes long, whereby it becomes impossible to restrain the variation in cutting force, an effect of dividing cut chips is degraded due to greater intersecting angles between straight portions, and it becomes difficult to manufacture such a major cutting edge having two or more fold points.

Moreover, in the first embodiment, the minor cutting edge 9 is connected to the end 8A of the major cutting edge 8 that is positioned opposite to the corner cutting edge 7. The minor cutting edge 8 is formed so as to gradually depart from an extended line of the major cutting edge 8 extending from the end 8A (an extended line of the second straight portion 11 in the first embodiment) as the distance from the end 8A increases. As viewed in a state in which the throwaway insert 1 is attached to the cutting tool main body 16, the minor cutting edge 9 is disposed so as to be slightly inclined, e.g., approximately 0 to 3 degrees, toward the proximal end of the cutting tool main body 16 with respect to the plane P that is perpendicular to the axis O of the cutting tool main body 16 as the distance from the axis O decreases. Accordingly, when a plane portion U is formed in a workpiece W with a relatively large feed rate, accuracy of the finished surface may be improved by cutting off, by the minor cutting edge 9, projected portion (tool mark) in the plane portion U formed by every feed.

Furthermore, in the first embodiment, the insert body 2 is formed in a shape which is rotationally symmetrical about the central axis C at every 120 degrees. Accordingly, when the throwaway insert 1 of the first embodiment is attached to the cutting tool main body 16 in such a manner that the minor cutting edge 9 is projected from the distal end of the cutting tool main body 16 and is disposed substantially along the plane P, the concave portion 13, which is formed in the same side edge along which the minor cutting edge 9 and the major cutting edge 8 are formed, is disposed at a position closer to the center of the cutting tool main body 16. The tangent M, along which the concave portion 13 extends, intersects the plane P, along which the minor cutting edge 9 substantially extends, at an obtuse angle, i.e., the tangent M is inclined toward the proximal end of the cutting tool main body 16 as the distance from the axis O decreases, and the concave portion 13 is made concave from the tangent M; therefore, according to the first embodiment, at a position closer to the center of the cutting tool main body 16 than from the minor cutting edge 9, there is provided a relatively large gap between the plane portion U to be cut by the minor cutting edge 9 and the side edge of the cutting face 3, or between the plane portion U and the side surface of the insert body 2, and thus accuracy of the finished surface of the plane portion U is prevented from being degraded due to packing of cut chips in the gap. Moreover, because the bottom surface 12A of the recess 12 formed in the side surface of the insert body 2 that is connected to the concave portion 13 is formed so as to intersect the cutting face 3 at an acute angle, i.e., so as to have a flank angle with respect to the cutting face 3, as the flank 5 that is connected to the major cutting edge 8 and minor cutting edge 9 which are projected from the distal end of the cutting tool main body 16, a cutting operation can be smoothly performed while preventing interference between the bottom surface 12A and the plane portion U even when the cutting operation is performed in such a manner that the cutting tool main body 16 is rotated about the axis O while being advanced distally for cutting the plane portion U as long as the advancing angle due to feed in the axial direction is smaller than the flank angle.

Moreover, in the first embodiment, because the minor cutting edge 9 is formed in a convex arc shape, the convex arc of the minor cutting edge 9 overlaps with itself before and after rotation of the throwaway insert 1, whereby it is possible to prevent degradation of accuracy of the finished surface of the plane portion P which is finished by the minor cutting edge 9 even when the throwaway insert 1 rotates about the central axis C, and the chord of the minor cutting edge 9 is moved from the plane P during cutting despite of engagement of the recess 12 with the convex portion 18D, and pressing by the clamp mechanism 20. In order to obtain such effects, the radius R of the arc defining the minor cutting edge 9 is preferably set to be 1 to 100 times D, where D is the diameter of the inscribed circle of the cutting face 3. If the radius R is set to be below the above range, accuracy of the finished surface may be degraded when feed rate is increased. In contrast, if the radius R is set to be above the range, the minor cutting edge 9 may substantially be a straight shape.

Figure 12:
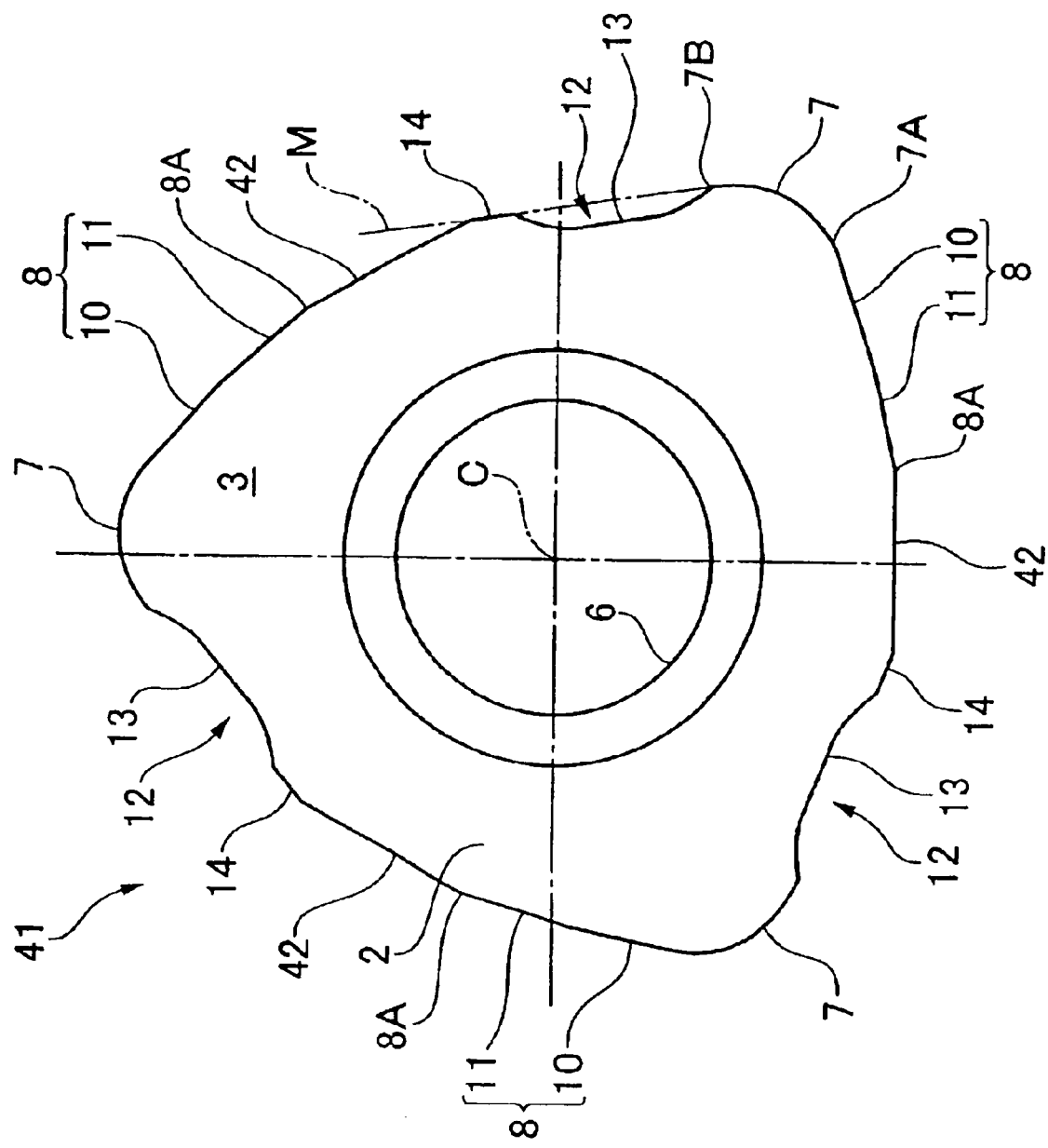
FIG. 12 is a plan view showing a throwaway insert 41 according to a fourth embodiment of the present invention.
Figure 13:
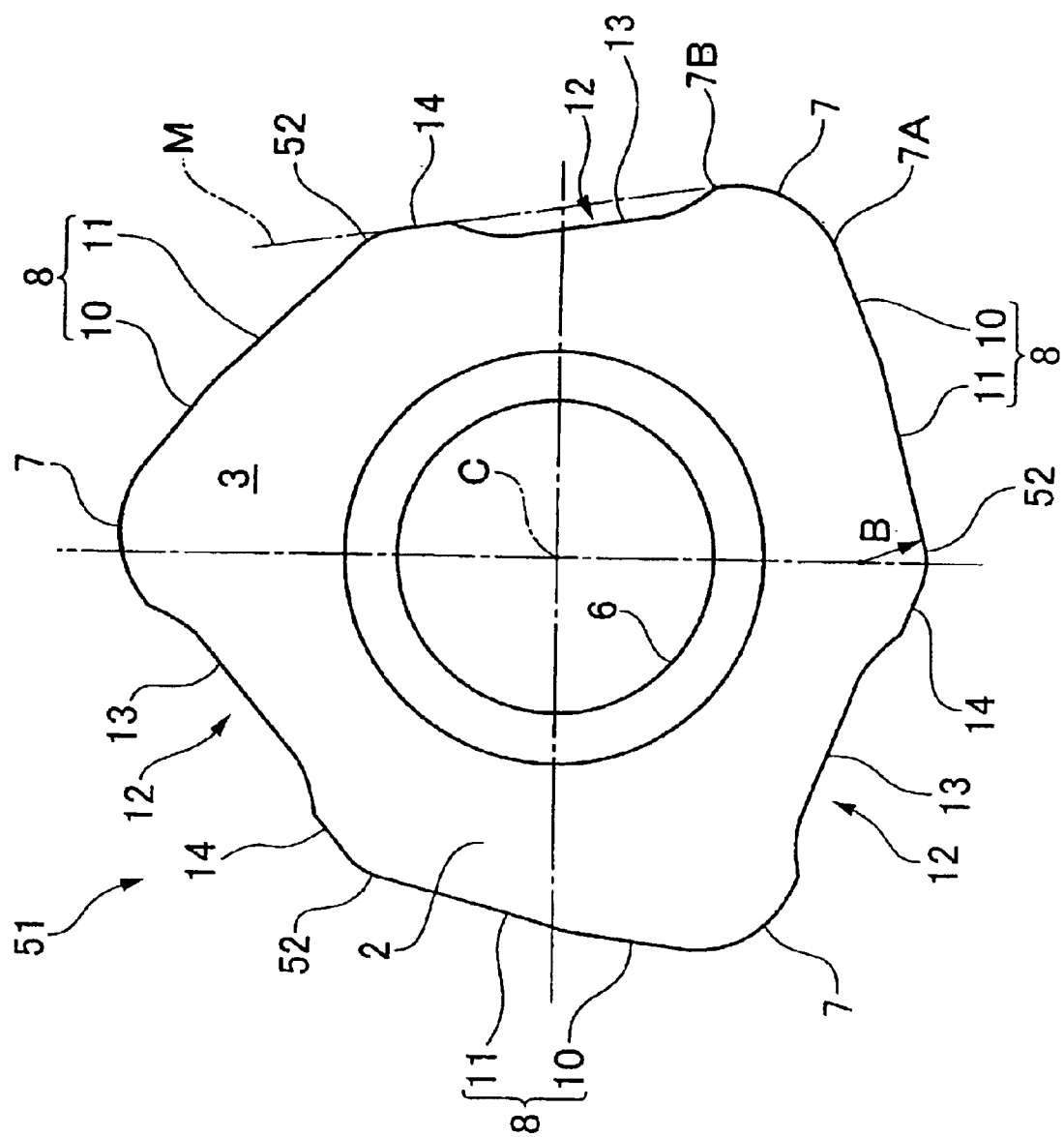
FIG. 13 is a plan view showing a throwaway insert 51 according to a fifth embodiment of the present invention.

In the first embodiment, because the concave portion 13 is formed in the cutting face 3, and accordingly, the recess 12 is formed in the side surface of the insert body 2, and because the convex portion 18D, which is engageable with the recess 12, is provided with the insert attaching seat 18 of the cutting tool main body 16, a fixing rigidity of the throwaway insert 1 is increased, and rotation of the insert body 2 about the central axis C can be reliably prevented. As long as the recess 12 and the concave portion 13 are provided, a throwaway insert may be configured as the throwaway insert 41 according to a fourth embodiment shown in FIG. 12, in which the minor cutting edge 42 is formed as a straight line, and the throwaway insert 41 is attached to the cutting tool main body 16 in such a manner that the minor cutting edge 42 is disposed with an angle ?, for example, 0 to 3 degrees with respect to the plane P. Moreover, if feed rate for every rotation of the cutting edge is relatively small, the radius B of the minor cutting edge 52 in the throwaway insert 51 of a fifth embodiment shown in FIG. 13 may be set to be smaller than radius R in the first embodiment, or alternatively, the minor cutting edge may be omitted. Specifically, in the fifth embodiment, or in another embodiment having no minor cutting edge, because a portion of the side edge of the cutting face that is occupied by the concave portion 13 may be elongated, the gap between the insert body 2 and the vertically extending wall V, or the gap between the insert body 2 and the plane portion U may be enlarged; therefore, packing of cut chips in the gap may be more reliably prevented.

In the first to fifth embodiments, the insert body 2 is formed in substantially an equilateral triangular plate shape (more specifically, in a nonequilateral hexagonal shape, more specifically, a nonequilateral nonagonal shape when the major cutting edge 8 or 32 is deemed to be a side of a polygon, and more specifically, a nonequilateral dodecagonal shape when the first and second straight portions 10 and 11 of the major cutting edge 8 are deemed to be two sides of a polygon), and each of three side edges of the cutting face 3 is provided with the major cutting edge 8 or 32, the minor cutting edge 9, 42, or 52, and the concave portion 13 or 22; however, the insert body may be formed in a parallelogram plate shape, a corner cutting edge may be formed with an acute angled corner of a cutting face having substantially a parallelogram shape, a major cutting edge and, if necessary, a minor cutting edge may be formed along a side edge of the cutting face that is connected to the corner, and a concave portion may be formed in the other side edge. In this case, in order to ensure a gap between the insert body and the plane portion of a workpiece, another concave portion may preferably be provided in the side edge, along which the major cutting edge extends, at a position opposite to the corner cutting edge that is connected to the major cutting edge.

Figure 15:
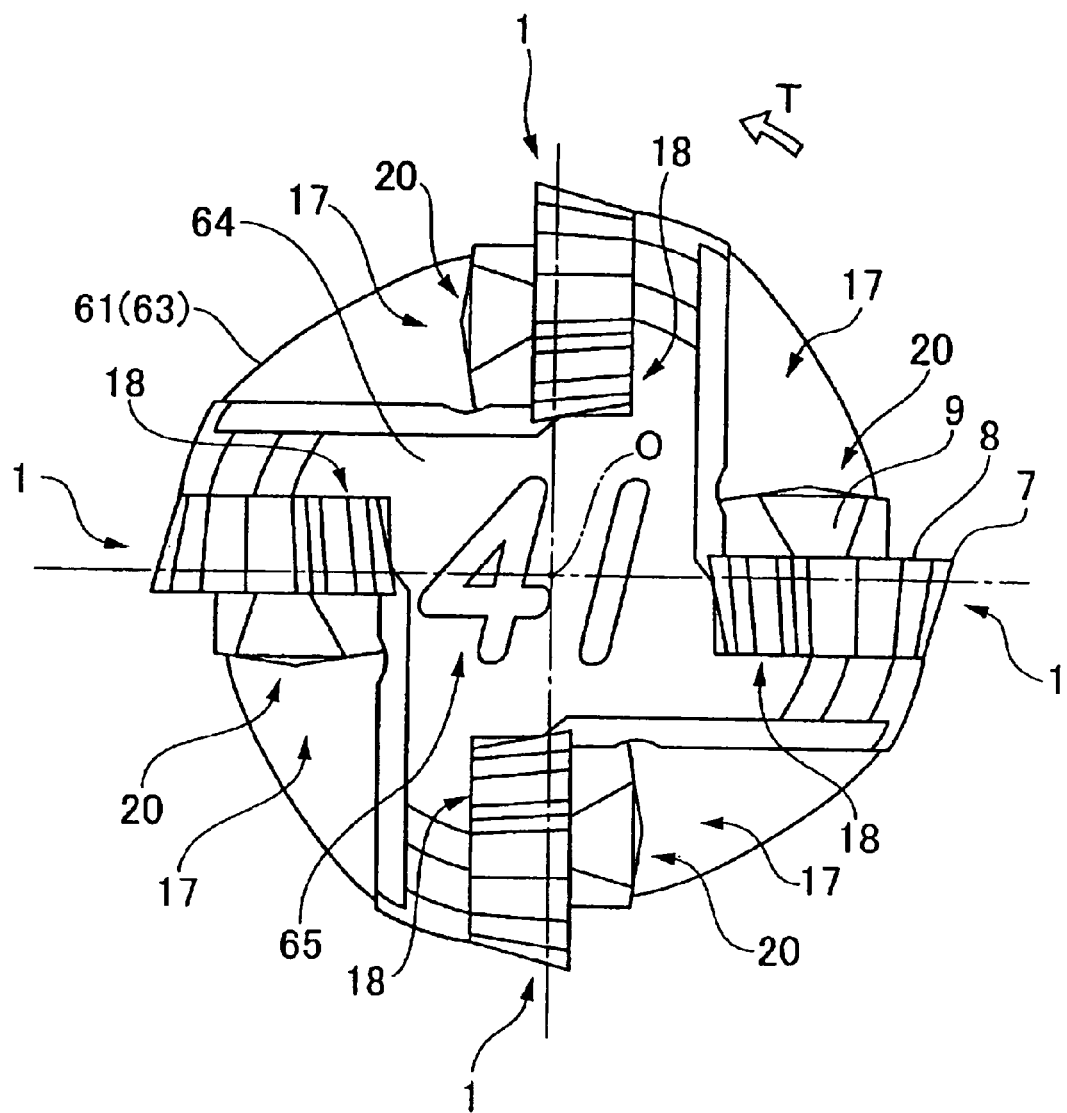
FIG. 15 is a bottom view showing the throwaway tool of the second embodiment as viewed from the distal end of an axis O.
Figure 16:
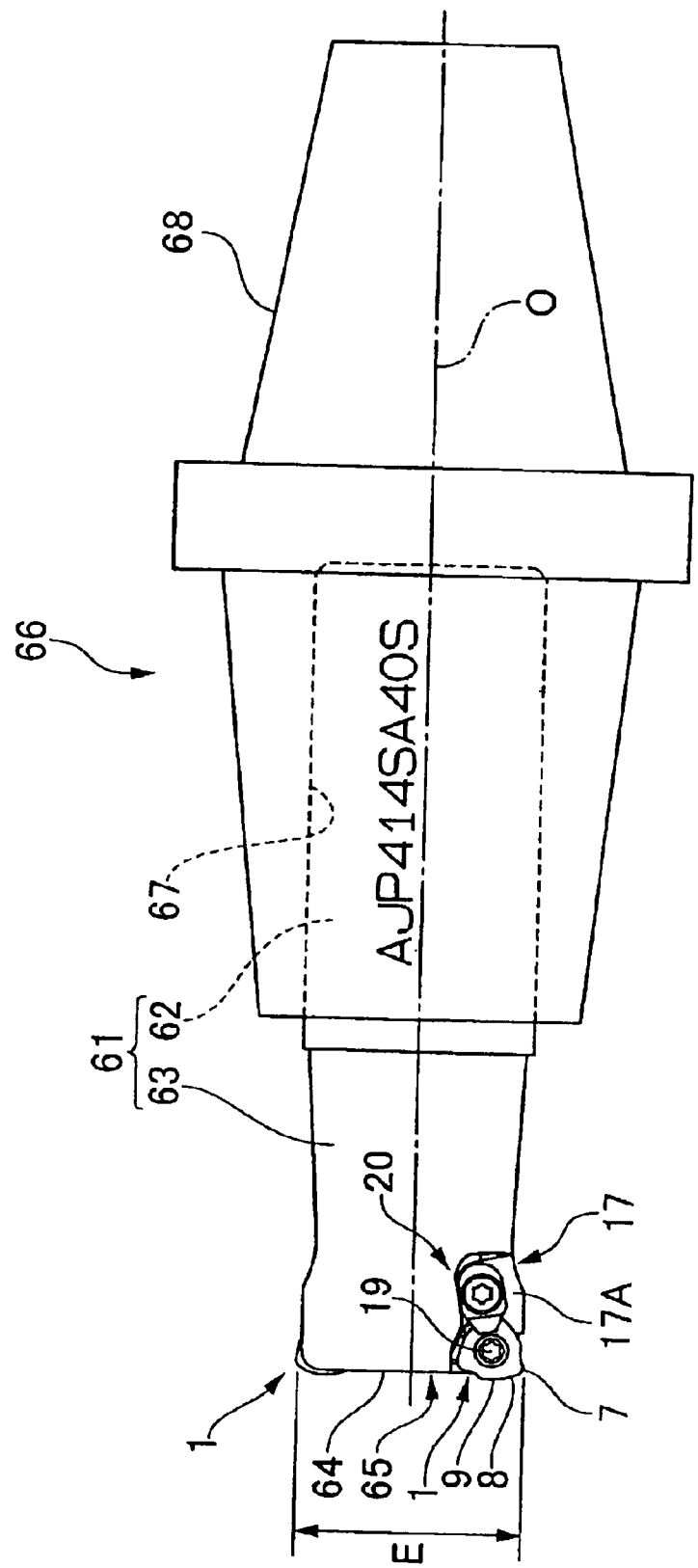
FIG. 16 is a side view showing a state in which the throwaway tool of the second embodiment is attached to a holder 66 (note that a chip pocket 17, an insert attaching seat 18, etc., are not shown in some of the throwaway inserts 1).

Next, a second embodiment of a cutting tool according to the present invention will be explained with reference to FIGS. 14 to 16. The same reference symbols are applied to the same elements as in the first embodiment of the cutting tool, and explanations thereof will be omitted. In this embodiment, the present invention is applied to a throwaway type end mill. The cutting tool main body 61 is formed in a cylindrical shape which is more elongated than the first embodiment, in which the length thereof along the axis O is set to be greater than that the outer diameter thereof. The proximal portion thereof is made as a cylindrical shaft-shaped shank 62 which extends along the axis O while placing the center thereof on the axis O. The diameter of the distal portion 63 of the cutting tool main body 61 that is located closer to the distal end than from the shank 62 is reduced from the shank 62 with a step, and is gradually further reduced, with a small angle as viewed in a side view, and then, the diameter is increased so as to form a concave shape as viewed in a side view, as the distance from the distal end decreases, and then, the diameter is unchanged to a distal end surface 64 of the cutting tool main body 61. In the outer periphery of the distal portion 63, there are formed chip pockets 17 which open toward the distal end surface 64, and which extend toward the proximal end portion. The throwaway insert 1 of the first embodiment is detachably attached to the insert attaching seat 18, which is formed in the wall 17A of the chip pocket 17 that faces in the direction of rotation T at a position close to the distal end, using the clamp screw 19 and clamp mechanism 20.

On the distal end surface 64, there is provided an indication 65 indicating dimensional information which includes the diameter E of cutting edge circle of the cutting tool. In the cutting tool of this embodiment, the corner cutting edge 7 in the throwaway insert 1, which is projected radially and outwardly from the distal end of the cutting tool main body 61 as in the first embodiment, is positioned at the outermost point from the axis O; therefore, the diameter of the circle (41 mm in this embodiment) defined by rotating the outermost point of the corner cutting edge 7 about the axis O is indicated by the indication 65 as the diameter E of cutting edge circle of the cutting tool. The indication 65 is provided by imprinting or the like.

Figure 14:
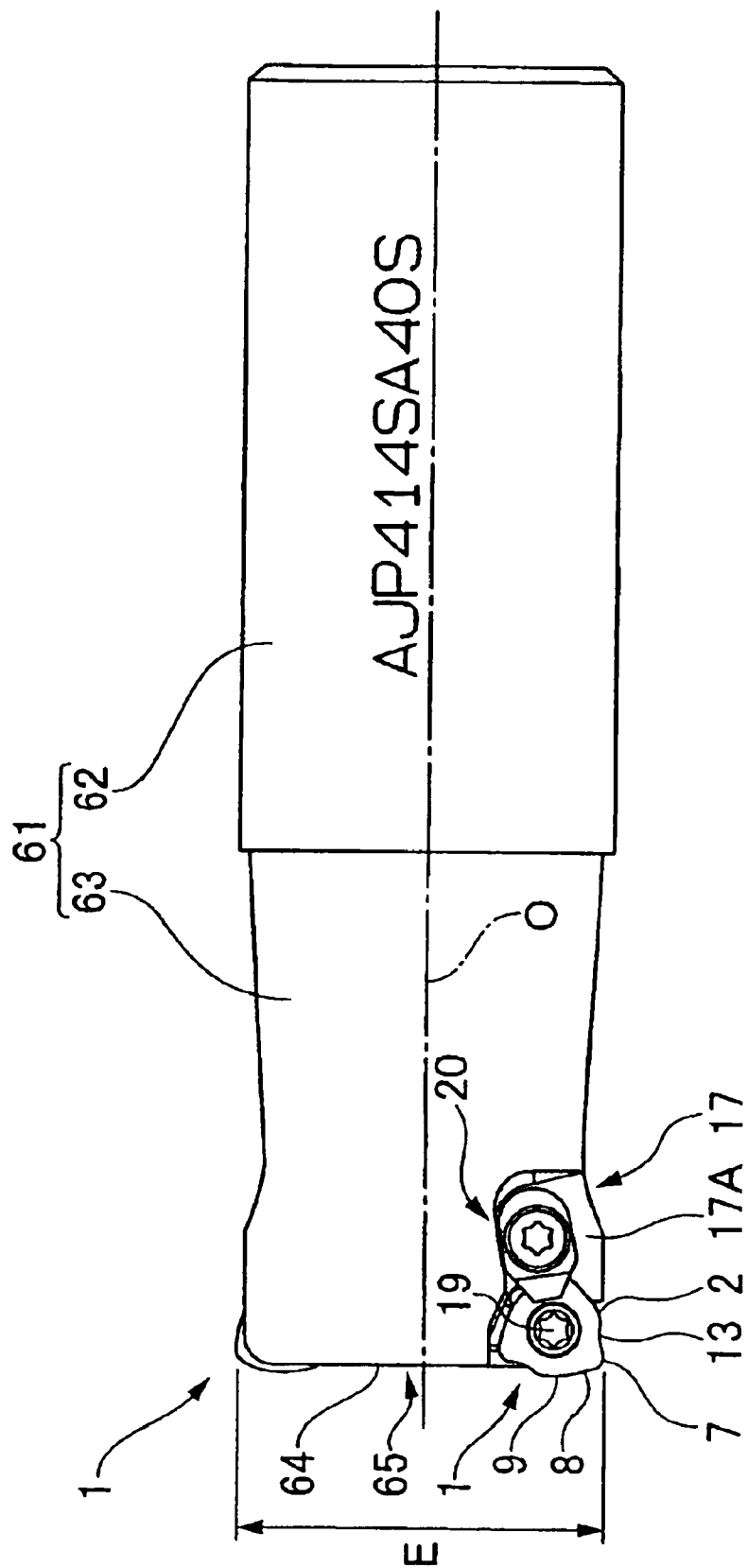
FIG. 14 is a side view showing a state in which a throwaway tool of a second embodiment of the present invention is provided with the throwaway inserts 1 of the first embodiment (note that a chip pocket 17, an insert attaching seat 18, etc., are not shown in some of the throwaway inserts 1).

In general, in a cutting tool having a shank as the shaft-shaped shank 62 or the like, dimensional information such as the diameter E of cutting edge circle, or a model number is indicated on the shank 62 by imprinting as shown in FIG. 14. On the other hand, a cutting tool of this type is usually held in a holder 66 having an attachment hole 67 into which the shank 62 of the cutting tool is inserted as shown in FIG. 16, and a cutting operation is performed while a tapered shank 68 as the proximal portion of the holder 66 is attached to the major spindle of a machine tool, and the holder 66 is rotated about the axis O. The cutting tool is stored in a magazine of a machine tool while being held in the holder 66. Accordingly, although the dimensional information indicated on the shank 62 is shown in solid lines in FIG. 16, the dimensional information is actually covered by the holder 66; therefore, the cutting tool main body 61 must be removed from the holder 66 whenever the dimensional information is to be read. In general in conventional cutting tools of this type, the diameter E of cutting edge circle and the diameter of the shank 62 are the same with respect to each other; therefore, the diameter E of cutting edge circle may be confirmed by looking at the indication on the holder 66 that indicates the diameter of the shank 62 which is attachable into the attachment hole 67. However, in recent years, cutting tools in which the diameter E of cutting edge circle is set to be greater than the diameter of the shank 62 by approximately 1 to 2 mm are also used; therefore, the diameter E of cutting edge circle may not be confirmed by looking at the indication on the holder 66.

In contrast, in the cutting tool according to the second embodiment, because the indication 65 is provided on the distal end surface 64 of the cutting tool main body 61 as explained above, it is easy to see the indication 65 even when the shank 62 is held in and covered by the holder 66. Moreover, even when the cutting tool is accommodated in a magazine while being held in the holder 66, it is easy to see the indication 65 because, in general, a holder such as the holder 66 is accommodated in a magazine in such a manner that the distal end of the holder is directed toward the open end of the magazine. The indication 65 functions well if the indication 65 includes just the diameter E of cutting edge circle as dimensional information; however, the indication 65 may also include other dimensional information, a model number, etc. The indication 65 may be made by a method other than imprinting. Furthermore, the throwaway insert to be attached to the cutting tool main body 61 according to the second embodiment may be the throwaway insert 1 according to the first embodiment, the throwaway insert 21, 31, 41, or 51 according to the second to fifth embodiment, or a throwaway insert having other polygonal plate shape such as a parallelogram plate shape.

As explained above, in the throwaway insert according to the present invention, because a major cutting edge is formed along the side edge of a cutting surface that is connected to a first end of a corner cutting edge, and a concave portion, which is made concave toward the inside of the cutting face from a tangent of the corner cutting edge drawn at a second end of the corner cutting edge, and which is adjacent to the second end of the corner cutting edge, is formed in the side edge of the cutting face that is connected to the second end of the corner cutting edge, when the throwaway insert is attached to a cutting tool main body in such a manner that the major cutting edge is projected from the distal end of the cutting tool main body, the corner cutting edge is projected radially and outwardly from the cutting tool main body, and the tangent of the corner cutting edge is inclined toward the inside of the cutting tool main body as the distance from the proximal end of the cutting tool main body decreases, a large gap between the side edge of the cutting face that is positioned closer to the proximal end than from the corner cutting edge and a surface being machined, and a large gap between the side surface of the insert main body and the surface being machined can be ensured, and thus degradation of the accuracy of a finished surface due to cut chips packed in the gaps can be prevented, and also chipping off of the throwaway insert can be prevented. As a result, a machined surface having high quality can be reliably obtained. In addition, by providing another corner cutting edge at another corner of the polygonal cutting face, as well as another concave portion which is adjacent to an end of another corner cutting edge, and by providing a convex portion in the cutting tool main body that is engageable with another concave portion, fixing rigidity of the throwaway insert can be increased, and thus a stable and smooth cutting operation may be performed.

What is claimed is:

1. A throwaway cutting tool comprising:
   a cutting tool main body which is rotatable about an axis of rotation, and which has a distal end and a proximal end; and
   a throwaway insert comprising:
      an insert body formed in a polygonal shape; and
      a cutting face formed by a polygonal face of the insert body;
      a corner cutting edge which is formed in a curved shape at a corner of the cutting face; and a major cutting edge which is formed along a side edge of the cutting face that is connected to a first end of the corner cutting edge; and a concave portion which is formed, in another side edge of the cutting face adjacent to the second end of the corner cutting edge, and so as to be made concave toward the inside of the cutting face from a tangent of the corner cutting edge drawn at the second end of the corner cutting edge, wherein the throwaway insert is detachably attached to an outer periphery of the distal end of the cutting tool main body in such a manner that the cutting face thereof is directed in the direction of rotation of the cutting tool main body;

wherein the corner cutting edge thereof is disposed at the distal end of the cutting tool main body while being projected radially and outwardly from the distal end;

wherein the major cutting edge connected to the first end of the corner cutting edge is projected distally from the cutting tool main body while being inclined so as to depart from the distal end as the distance from the first end of the corner cutting edge increases, and the distance from the center of the cutting tool main body decreases; and wherein the tangent drawn at the second end of the corner cutting edge is inclined toward the inside of the cutting tool main body as the distance from the proximal end of the cutting tool main body.

2. A throwaway cutting tool according to claim 1, wherein the concave portion is formed so as to be connected to the second end of the corner cutting edge.

3. A throwaway cutting tool according to claim 1, wherein the bottom of the concave portion is formed as a straight line.

4. A throwaway cutting tool according to claim 1, wherein the bottom of the concave portion is formed as a curved concave line.

5. A throwaway cutting tool according to claim 1, wherein the major cutting edge is formed along a tangent of the corner cutting edge drawn at the first end of the corner cutting edge.

6. A throwaway cutting tool according to claim 1, wherein the major cutting edge is formed by folded lines consisting of a tangent of the corner cutting edge drawn at the first end of the corner cutting edge and another line intersecting the tangent at a point distant from the corner cutting edge at an obtuse angle.

7. A throwaway cutting tool according to claim 1, wherein the throwaway insert further comprises a minor cutting edge which is provided on a side edge of the cutting face so as to be connected to an end of the major cutting edge opposite the corner cutting edge, and which is shaped so as to gradually deviate from an extended line of the major cutting edge toward the inside of the cutting face as the distance from the end of the major cutting edge increases.

8. A throwaway cutting tool according to claim 7, wherein the minor cutting edge is shaped in a circular arc.

9. A throwaway insert according to claim 8, wherein the radius of the circular arc forming the minor cutting edge is set to be 1 to 100 times D, where D is the diameter of an inscribed circle of the cutting face.

10. A throwaway cutting tool according to claim 1, wherein there is formed a shaft-shaped shank extending along the axis of rotation in the vicinity of the proximal end of the cutting tool main body, and wherein dimensions including the diameter of cutting edge circle of the cutting tool are indicated on a surface of the tip portion of the cutting tool main body.

* * * * *